(12) United States Patent
Salazar et al.

(10) Patent No.: US 11,867,142 B2
(45) Date of Patent: Jan. 9, 2024

(54) SYSTEMS AND METHODS FOR FUEL INJECTOR CONTROL

(71) Applicant: Transportation IP Holdings, LLC, Norwalk, CT (US)

(72) Inventors: Victor Manuel Salazar, Clifton Park, NY (US); Adam Edgar Klingbeil, Ballston Lake, NY (US); Pradheepram Ottikkutti, Lawrence Park, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/396,356

(22) Filed: Aug. 6, 2021

(65) Prior Publication Data
US 2021/0363952 A1 Nov. 25, 2021

Related U.S. Application Data

(63) Continuation-in-part of application No. 16/380,727, filed on Apr. 10, 2019, now Pat. No. 11,085,410,
(Continued)

(51) Int. Cl.
*F02M 61/00* (2006.01)
*F02M 61/10* (2006.01)
(Continued)

(52) U.S. Cl.
CPC ......... *F02M 61/10* (2013.01); *F02D 41/1439* (2013.01); *F02D 41/20* (2013.01);
(Continued)

(58) Field of Classification Search
CPC .... F02M 61/10; F02M 61/182; F02M 45/086; F02M 41/1439; F02M 41/26;
(Continued)

(56) References Cited

U.S. PATENT DOCUMENTS 4,546,739 A * 10/1985 Nakajima ............... F02M 61/04
  239/585.4
4,700,672 A * 10/1987 Baguena ................ F02M 43/00
  123/304

(Continued)

FOREIGN PATENT DOCUMENTS

RU   2712548 C2   1/2020
RU   2745692 C1   3/2021
(Continued)

OTHER PUBLICATIONS

Search Report received for related EA Patent Application No. 202292039 dated Jan. 11, 2023 (5 pages).
(Continued)

*Primary Examiner* — Phutthiwat Wongwian
*Assistant Examiner* — Sherman D Manley
(74) *Attorney, Agent, or Firm* — The Small Patent Law Group LLC; Philip S. Hof

(57) ABSTRACT

A multi-fuel injector assembly in one embodiment includes a first fuel injector assembly to deliver a first type of fuel and a second fuel delivery system to deliver a second type of fuel. The first fuel injector includes a first nozzle, at least one first needle, and at least one first actuator configured to move the at least one first needle. The at least one first actuator moves the at least one first needle to a first fuel delivery configuration that corresponds to a first fuel mixture composition, and a second fuel delivery configuration that corresponds to a second fuel mixture composition.

20 Claims, 10 Drawing Sheets

Related U.S. Application Data which is a continuation of application No. 15/197,038, filed on Jun. 29, 2016, now Pat. No. 10,302,056.

(51) Int. Cl.
| | |
|---|---|
| *F02D 41/20* | (2006.01) |
| *F02M 61/18* | (2006.01) |
| *F02M 45/08* | (2006.01) |
| *F02D 41/14* | (2006.01) |
| *F02D 41/26* | (2006.01) |
| *F02M 51/06* | (2006.01) |

(52) U.S. Cl.
CPC ......... *F02D 41/2096* (2013.01); *F02D 41/26* (2013.01); *F02M 45/086* (2013.01); *F02M 51/0607* (2013.01); *F02M 51/0653* (2013.01); *F02M 61/182* (2013.01); *F02D 2041/2024* (2013.01); *F02D 2041/2079* (2013.01); *F02M 2200/46* (2013.01)

(58) Field of Classification Search
CPC ............... F02M 41/2096; F02M 41/20; F02M 51/0607; F02M 51/0653; F02M 2200/46; F02D 2041/2024; F02D 2041/2079
See application file for complete search history.

(56) References Cited

U.S. PATENT DOCUMENTS

| | | | | |
|---|---|---|---|---|
| 4,984,540 A * | 1/1991 | Morikawa | ........... | F02D 35/0038 123/681 |
| 5,398,654 A * | 3/1995 | Niebrzydoski | ........ | F02M 69/08 123/445 |
| 6,206,304 B1 * | 3/2001 | Koseki | .................. | F02M 61/16 239/581.1 |
| 6,422,199 B1 * | 7/2002 | Buckley | ............... | F02M 47/027 239/444 |
| 6,467,702 B1 * | 10/2002 | Lambert | .............. | F02M 45/086 239/533.8 |
| 6,769,635 B2 * | 8/2004 | Stewart | ................ | F02M 47/027 239/585.4 |
| 6,978,760 B2 * | 12/2005 | Stewart | .............. | F02M 63/0064 123/305 |
| 7,143,964 B2 * | 12/2006 | Kuegler | ............... | F02M 45/086 239/533.11 |
| 7,159,568 B1 * | 1/2007 | Lewis | ................... | F02D 19/081 123/576 |
| 7,201,137 B2 * | 4/2007 | Kesse | ................. | F02D 41/3047 123/295 |
| 7,219,649 B2 * | 5/2007 | Duffy | .................... | F02D 41/402 123/305 |
| 7,556,017 B2 * | 7/2009 | Gibson | ................ | F02M 45/086 123/305 |
| 8,496,191 B2 * | 7/2013 | Grant | ................... | F02M 45/086 239/533.2 |
| 8,944,027 B2 * | 2/2015 | Montgomery | ..... | F02M 21/0254 123/304 |
| 9,046,067 B2 * | 6/2015 | Brown | ................... | F02M 63/00 |
| 9,255,557 B2 * | 2/2016 | Park | ................... | F02M 63/0078 |
| 9,376,992 B2 * | 6/2016 | Brown | ............... | F02M 21/0263 |
| 9,915,215 B2 * | 3/2018 | John | .................. | F02M 63/0054 |
| 10,302,056 B2 * | 5/2019 | Salazar | ................ | F02M 61/182 |
| 10,337,448 B2 * | 7/2019 | Zhang | ................... | F02D 41/402 |
| 10,954,880 B1 * | 3/2021 | Thomas | .............. | F02M 69/465 |
| 11,156,148 B1 * | 10/2021 | Engineer | .............. | H01T 13/467 |
| 2002/0020388 A1 * | 2/2002 | Wright | ................ | F02D 41/3035 123/304 |
| 2003/0010320 A1 * | 1/2003 | Gillis | ..................... | F02M 43/00 123/468 |
| 2003/0038185 A1 * | 2/2003 | Carrol, III | ........... | F02M 45/086 239/96 |
| 2013/0160741 A1 * | 6/2013 | Sommars | ............ | F02D 19/0647 123/456 |
| 2014/0123937 A1 * | 5/2014 | Wickstone | .......... | F02D 19/0694 123/299 |
| 2015/0267659 A1 * | 9/2015 | Jaegle | .................. | F02M 51/061 239/585.5 |
| 2016/0069312 A1 * | 3/2016 | Brown | .................. | H01F 7/1607 239/585.5 |
| 2016/0090927 A1 * | 3/2016 | Kawabe | ................. | F02M 26/03 123/294 |
| 2016/0305382 A1 * | 10/2016 | Kim | ........................ | F02D 19/10 |
| 2016/0319754 A1 * | 11/2016 | Kalenborn | .......... | F02D 19/0694 |
| 2017/0130685 A1 * | 5/2017 | Kalenborn | ............. | F02M 61/14 |
| 2017/0356383 A1 * | 12/2017 | Ito | ....................... | F02B 23/0648 |
| 2018/0003131 A1 * | 1/2018 | Berger | ............... | F02M 21/0275 |
| 2018/0003139 A1 * | 1/2018 | Salazar | ................ | F02D 41/2096 |
| 2019/0145340 A1 * | 5/2019 | John | ....................... | F02D 41/40 123/299 |
| 2019/0170103 A1 * | 6/2019 | Martin | ............... | F02M 61/1806 |
| 2019/0186448 A1 * | 6/2019 | Mahmood | .......... | F16K 31/1245 |
| 2020/0063701 A1 * | 2/2020 | Anders | ............... | F02B 23/0669 |
| 2020/0063704 A1 * | 2/2020 | Anders | ............... | F02D 41/3011 |

FOREIGN PATENT DOCUMENTS

| | | |
|---|---|---|
| SU | 1300182 A1 | 3/1987 |
| SU | 1344931 A1 | 10/1987 |

OTHER PUBLICATIONS

Office Action received for related EA Patent Application No. 202292039 dated Feb. 21, 2023 (5 pages).

\* cited by examiner

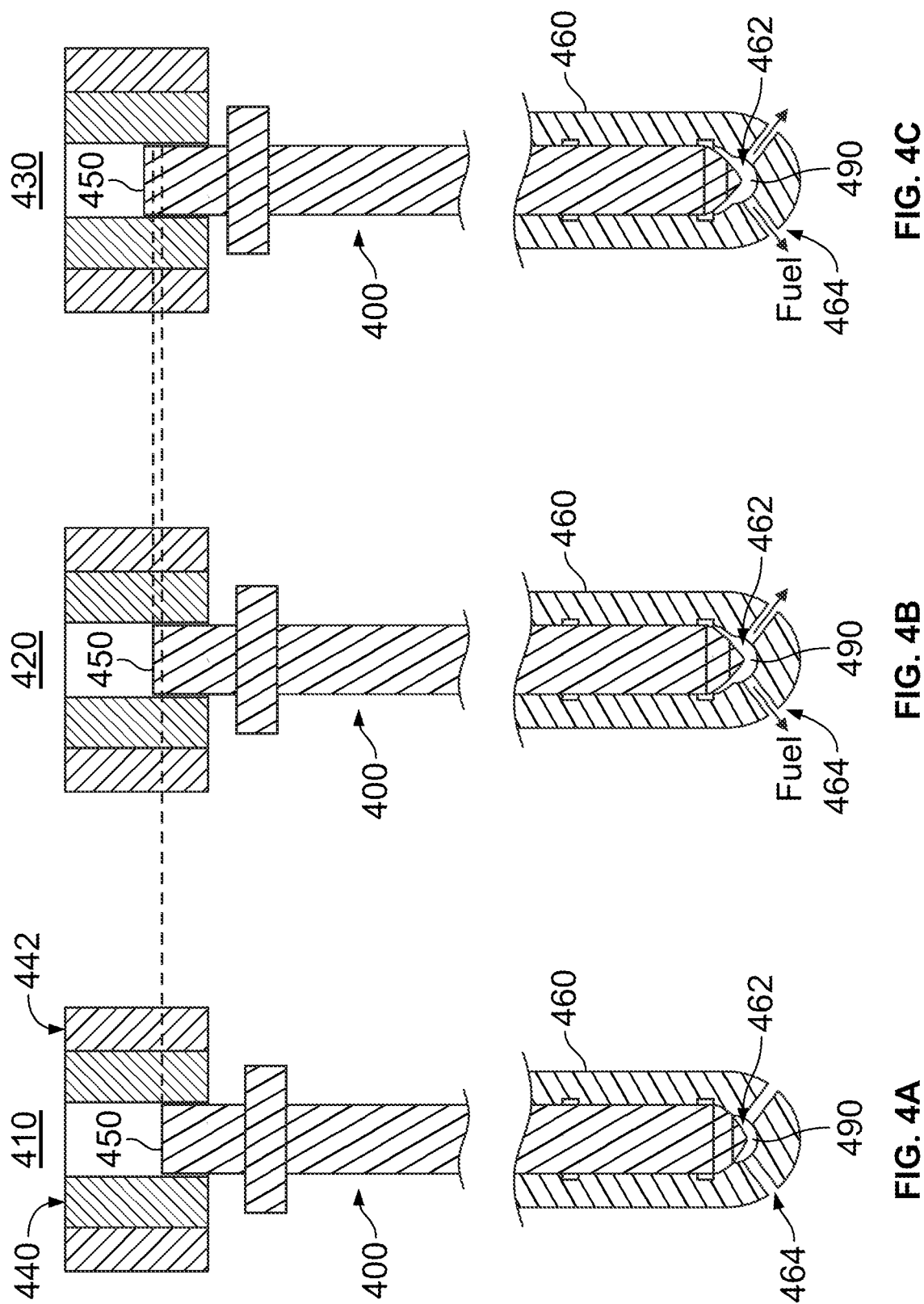

SYSTEMS AND METHODS FOR FUEL INJECTOR CONTROL

This application is a continuation-in-part of, and claims priority to U.S. patent application Ser. No. 16/380,727, entitled "Systems and Methods for Fuel Injector Control," filed Apr. 10, 2019, which is in turn a continuation of, and claims priority to, U.S. patent application Ser. No. 15/197,038, entitled "Systems and Methods for Fuel Injector Control," filed Jun. 29, 2016. The entire content of the application Ser. No. 15/197,038 and the Ser. No. 16/380,727 application is hereby incorporated by reference herein in its entirety.

BACKGROUND

Engines, such as internal combustion engines, may utilize a piston that reciprocates in a cylinder. In various direct injection engines, a fuel-air mixture for combustion may be ignited by a spark, by a diesel pilot injection, or by another ignition source (e.g. laser, plasma, etc.). However, the initial rate at which the fuel energy is released in the cylinder may be faster than desired, resulting in a high pressure rise rate, which, due to structural limitations (e.g., peak cylinder pressure limit), may act to limit engine operation for high loads.

BRIEF DESCRIPTION

In one embodiment, a fuel injector assembly is provided that includes a nozzle, at least one needle, and at least one actuator. The nozzle includes at least one cavity in fluid communication with nozzle openings. The at least one needle is movably disposed within the at least one cavity, and prevents flow through the nozzle openings in a closed position. The at least one actuator is configured to move the at least one needle within the cavity. The at least one actuator is configured to move the at least one needle to at least a first fuel delivery configuration and a second fuel delivery configuration (e.g., at different times of a combustion cycle). A first amount of fuel is delivered through the nozzle openings (e.g., at a first fuel delivery rate) with the at least one needle in the first fuel delivery configuration, and a second amount of fuel is delivered through the nozzle openings with the at least one needle in the second fuel delivery configuration (e.g., at a second fuel delivery rate).

In another embodiment, a method is provided that includes moving, with at least one actuator, at least one needle within at least one cavity of a nozzle from a closed position to a first fuel delivery configuration, to deliver a first amount of fuel (e.g., at a first fuel delivery rate) in the first fuel delivery configuration through openings of the nozzle to a cylinder. Fluid is prevented from flowing through the openings of a nozzle in the closed position. The method also includes moving, with the at least one actuator, the at least one needle within the at least one cavity from the first fuel delivery configuration to a second fuel delivery configuration to deliver a second amount of fuel at a second fuel delivery rate through the openings.

In another embodiment, an engine system is provided that includes a cylinder of an engine, a fuel injector assembly, and at least one processor. The fuel injector assembly is configured to deliver fuel to the cylinder, and includes a nozzle, at least one needle, and at least one actuator. The nozzle includes at least one cavity in fluid communication with nozzle openings. The at least one needle is movably disposed within the at least one cavity, and prevents flow through the nozzle openings in a closed position. The at least one actuator is configured to move the at least one needle within the cavity. The at least one actuator is configured to move the at least one needle to at least a first fuel delivery configuration and a second fuel delivery configuration. (It may be noted that additional fuel delivery configurations may be utilized in various embodiments.) A first amount of fuel is delivered through the nozzle openings at a first fuel delivery rate with the at least one needle in the first fuel delivery configuration, and a second amount of fuel is delivered through the nozzle openings at a second fuel delivery rate with the at least one needle in the second fuel delivery configuration. The at least one processor is operably coupled to the at least one actuator, and is configured to control the actuator to move the at least one needle among the closed position, the first fuel delivery configuration, and the second fuel delivery configuration.

BRIEF DESCRIPTION OF THE DRAWINGS

FIG. 4A illustrates a fuel injector assembly in a closed position in accordance with various embodiments.

FIG. 4B illustrates the fuel injector assembly of FIG. 4A in a first fuel delivery configuration.

FIG. 4C illustrates the fuel injector assembly of FIGS. 4A-B in a second fuel delivery configuration.

DETAILED DESCRIPTION

Figure 1:
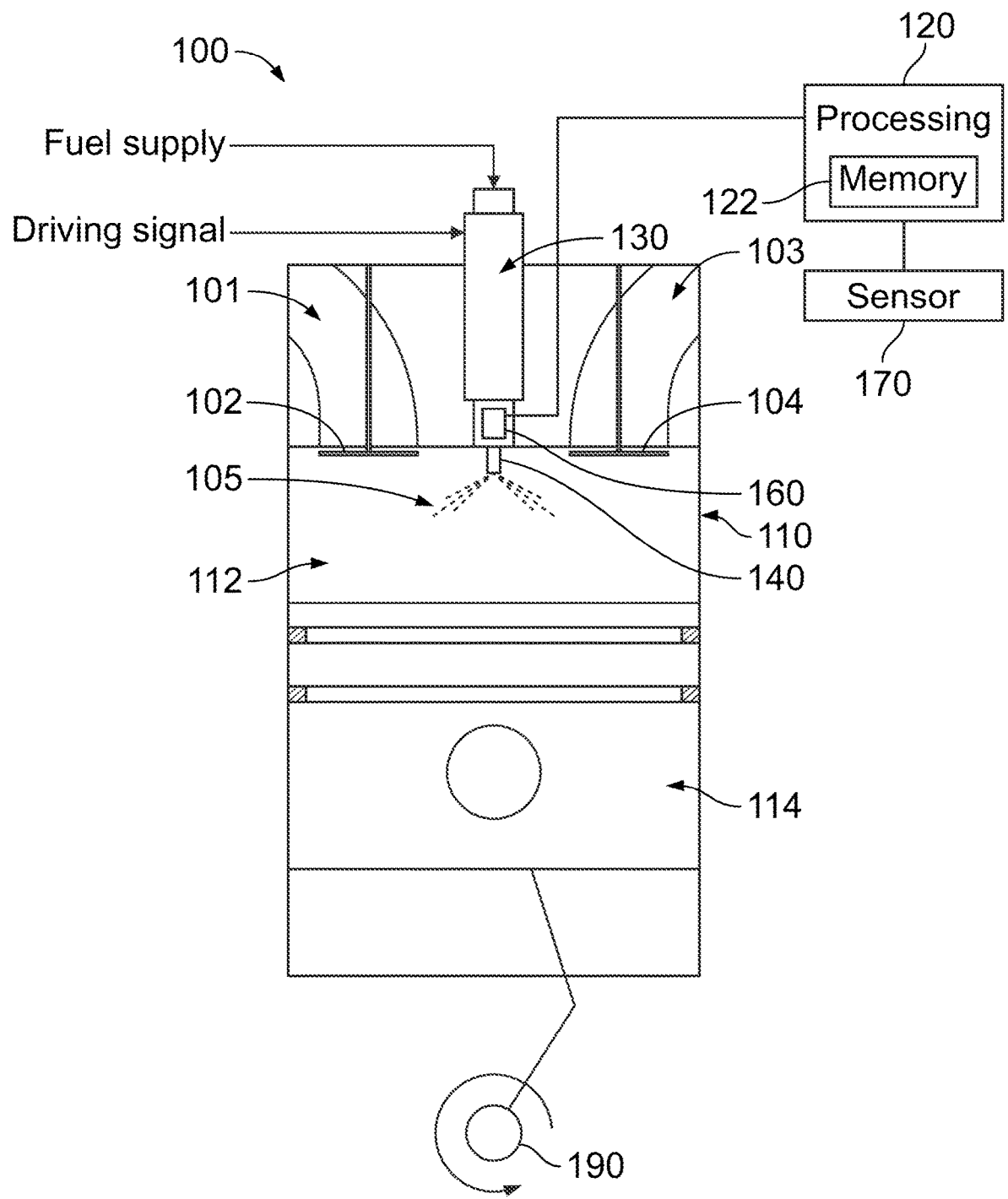
FIG. 1 is a schematic block diagram of an engine system in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide, for example, shaping of the rate at which the energy of a fuel is released, within one or more cylinders of an internal combustion engine, by controlling the rate at which the mass of fuel is directly injected by one or more fuel injectors. Various combinations of needles, cavities, and actuators are utilized in different embodiments to provide two or more fuel delivery configurations (e.g., a first fuel delivery configuration to deliver fuel in a lesser amount or at a lower rate, and a second fuel delivery configuration to deliver fuel in a greater amount or at a higher rate). In various embodiments, a first fuel delivery configuration is used to provide a smaller amount of fuel during an initial phase of an injection process to maintain the amount of energy released and the corresponding pressure rise rates within desirable operational levels in accordance with the engine speed and load. Additionally, the rate of injection in various embodiments is modified throughout the injection process, for example to achieve better combustion phasing, maintain the pressure rise rate under control, and optimize overall engine performance and emissions.

At least one technical effect of various embodiments includes improved control of pressure rise rates and peak cylinder pressures. At least one technical effect of various embodiments includes improved combustion phasing, engine performance, and/or emission levels. At least one technical effect of various embodiments includes simplification of structural requirements by allowing similar or better engine performance at lower in-cylinder pressures. At least one technical effect of various embodiments includes improved reliability and durability, and/or reduced life cycle cost (e.g., due to engine operation at lower cylinder pressures and/or pressure rise rates). At least one technical effect of various embodiments includes reduced emissions (e.g., due to improved combustion phasing and/or reduced cylinder pressure).

FIG. 1 is a schematic block diagram of an engine system 100 formed in accordance with various embodiments. As seen in FIG. 1, the depicted engine system 100 includes a cylinder 110, a processing unit 120, and a fuel injector assembly 130. Generally, the fuel injector assembly 130 provides fuel to the cylinder 110 for combustion to provide work output at the crank shaft (via turning crank shaft 190). In the illustrated embodiment, an inlet stream 101 of air is provided to a combustion chamber 112 of the cylinder 110 via an intake valve 102, and combusted along with fuel from the fuel injector assembly 130. After combustion, an exhaust stream 103 is evacuated from the combustion chamber 112 via an exhaust valve 104. Combustion in the combustion chamber 112 produces mechanical work that drives a piston 114 in reciprocating fashion to turn the crank shaft 190. The fuel injector assembly 130 includes a nozzle 140 through which fuel jets 105 supply fuel to the combustion chamber 112, with the amount of fuel controlled by movement of an actuator 160 of the fuel injector assembly 130. As used herein, an amount of fuel provided or supplied to the combustion chamber 112 may be understood as a rate of supply of fuel, or a volume or mass of fuel on a per time unit basis. Generally, the processing unit 120 control various aspects of the engine system 100 to control the amount of fuel and air provided to the combustion chamber 112, as well as the timing of providing fuel and air to the combustion chamber 112. For example, the depicted processing unit 120 transmits control or driving signals to control the actuator 160 to synchronize the delivery of fuel/fuels with the movements of the intake valve 102 and the exhaust valve 104. It may be noted that various embodiments may include additional components (e.g., additional cylinders or other engine components), or may not include all of the components shown in FIG. 1. Further, it may be noted that certain aspects of the system 100 shown as separate blocks in FIG. 1 may be incorporated into a single physical entity, and/or aspects shown as a single block in FIG. 1 may be shared or divided among two or more physical entities. It may be noted that, for dual fuel engines, some fuel may be supplied with an intake air charge.

Figure 2A:
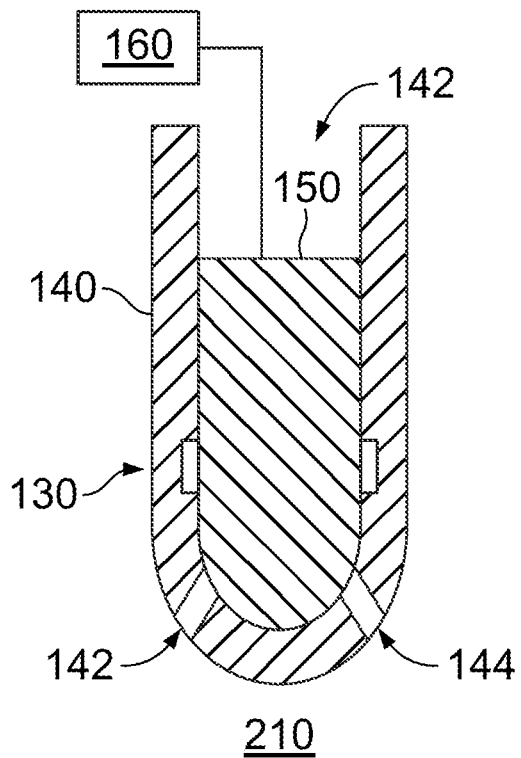
FIG. 2A illustrates a fuel injector assembly of FIG. 1 in a closed position.
Figure 2B:
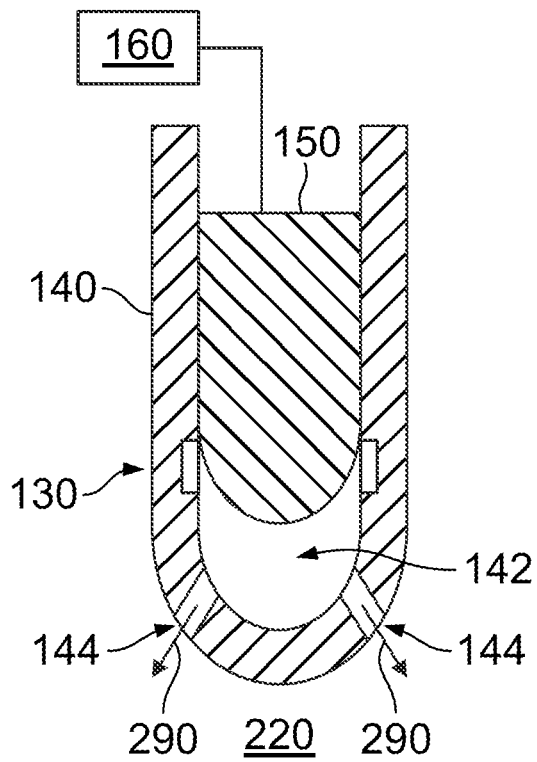
FIG. 2B illustrates the fuel injector assembly of FIG. 1 in a first fuel delivery configuration.
Figure 2C:
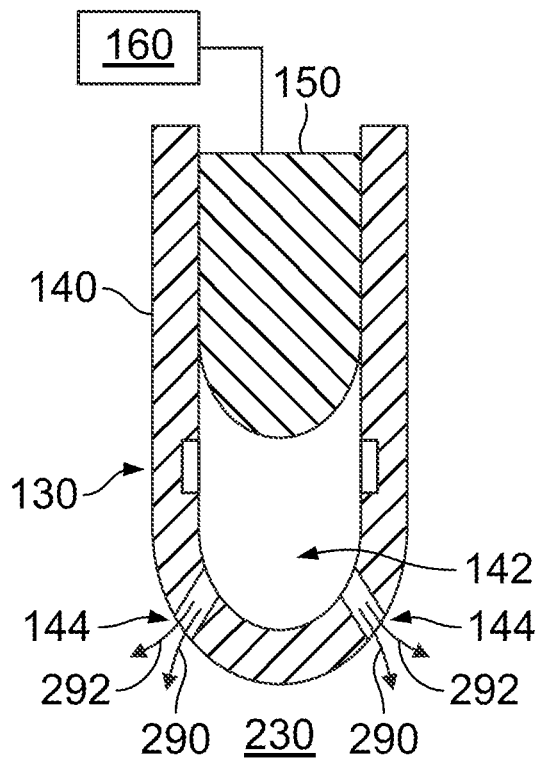
FIG. 2C illustrates the fuel injector assembly of FIG. 1 in a second fuel delivery configuration.

The fuel injector assembly 130 as discussed herein is configured to deliver fuel to the cylinder 110. FIGS. 2A-2C provide an enlarged view of the fuel injector assembly 130 in different fuel delivery configurations—FIG. 2A illustrates the fuel injector assembly 130 in a closed position 210, FIG. 2B illustrates the fuel injector assembly 130 in a first fuel delivery configuration 220, and FIG. 2C illustrates the fuel injector assembly 130 in a second fuel delivery configuration 230. As seen in FIGS. 1, 2A, 2B, and 2C, the depicted fuel injector assembly 130 includes the nozzle 140, a needle 150, and the actuator 160. While only a single nozzle, single needle, single cavity, and single actuator are depicted in FIGS. 1, 2A, 2B, and 2C, it may be noted that two or more nozzles, needles, cavities, and/or actuators may be employed in various embodiments as discussed herein.

As best seen in FIGS. 2A, 2B, and 2C, the nozzle 140 includes a cavity 142 and nozzle openings 144. The needle 150 is movably disposed within the cavity 142, with the needle 150 preventing flow through the nozzle openings 144 in the closed position 210 (see FIG. 2A). The actuator 160 moves the needle 150 within the cavity 142. For example, in the illustrated embodiment, the actuator 160 may be used to move the needle 150 to the first fuel delivery configuration 220 (see FIG. 2B) and the second fuel delivery configuration 230 (see FIG. 2C). Again, it may be noted that the particular example depicted in FIGS. 2A-C is provided by way of illustration and only includes a single needle and actuator for purposes of clarity; however, in various embodiments, multiple needles and/or cavities and/or actuators may be employed, with different needle positions or arrangements for one or more needles defining the first and second fuel delivery configurations. Further, additional fuel delivery configurations beyond first and second fuel delivery configurations may be employed in various embodiments. Generally, the first fuel delivery configuration 220 is used to provide fuel at a relatively lower rate during the beginning of combustion, and the second fuel delivery configuration 230 is used to provide fuel at a relatively higher rate later during combustion. In various embodiments, a first amount of fuel is delivered through the nozzle openings 144 with the fuel injector assembly 130 (e.g., needle 150 and/or other needles) in the first fuel delivery configuration 220, and a second amount of fuel along with the first amount of fuel is delivered through the nozzle openings 144 with the fuel injector assembly 130 (e.g., needle 150 and/or other needles) in the second fuel delivery configuration 230. For example, in some embodiments, the first fuel delivery configuration 220 may define a first fuel path (not shown in FIG. 2B-2C, see, e.g., FIG. 5 and related discussion) and the second fuel delivery configuration 230 may define a second fuel path (not shown in FIG. 2B-2C, see, e.g., FIG. 5 and related discussion). In the first fuel delivery configuration 220, fuel is only delivered along the first fuel path and not the second fuel path, while in the second fuel delivery configuration 230, fuel is delivered along both the first fuel path and the second fuel path. (See, e.g., FIG. 5 and related discussion.)

For example, as seen in FIG. 2A, the needle 150 is fully inserted into the cavity 142, obstructing the nozzle openings 144 in the closed position 210. A spring or other mechanism may be used to urge the needle 150 toward the closed position 210, with a force from the actuator 160 required to move the needle 150 out of the closed position 210. In FIG. 2B, the actuator 160 has moved the needle away from the bottom of the cavity 142, allowing a first amount of fuel 290 to flow through the nozzle openings 144. The first amount of fuel 290, for example, may be selected to provide a desired amount of fuel at the beginning of a combustion cycle. In FIG. 2C, the actuator 160 has moved the needle 150 farther from the bottom of the cavity 142, allowing an additional second amount of fuel 292 to flow through the nozzle openings 144 in addition to the first amount of fuel 290. It may be noted that in various embodiments, additional nozzle openings 144 may be utilized to allow the second amount of fuel 292 to flow in addition to the first amount of fuel 290 in the second fuel delivery configuration 230. (See, e.g., FIG. 5 and related discussion.) Additionally or alternatively, an additional one or more needles and/or cavities may be employed to allow the additional second amount of fuel 292.

Various modifications or alternate arrangements from the depicted example of FIGS. 1 and 2A-C may be employed in various embodiments. For example, more than one nozzle per cylinder may be employed, with a first nozzle providing the first amount 290 and a second nozzle providing the second amount 292. As another example, more than one cavity per nozzle may be employed, and/or more than one needle per cavity may be employed. Further still, more than one actuator may be used to move a corresponding needle (or needles). It may be noted that first fuel delivery configuration 220 and/or second fuel delivery configuration 230 may define a fixed or single position defining a set amount of fuel in some embodiments, while including a range of positions in other embodiments to allow a variable or adjustable amount of fuel in one or more fuel delivery configurations. It may be noted that in various embodiments, a given actuator may be shared between or among two or more needles, or may be dedicated to a single needle. Further still, in some embodiments, more than one actuator may be employed for a given needle. The actuator 160 may include, for example, one or more of a solenoid or piezo-electric actuator along with associated components.

Figure 3:
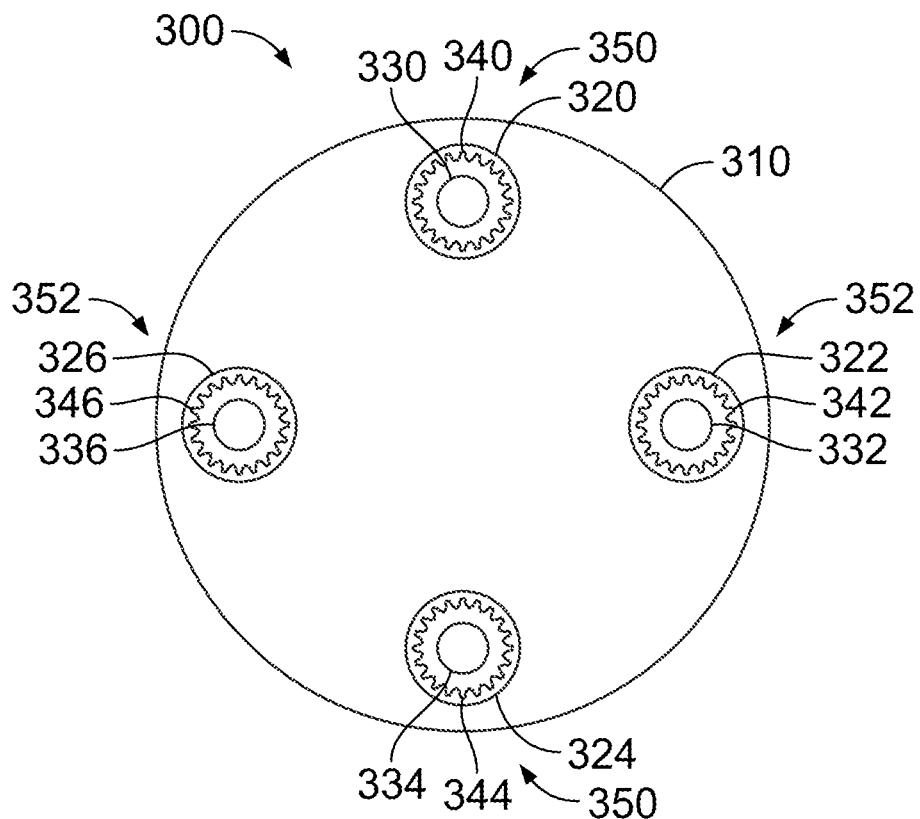
FIG. 3 illustrates an overhead plan view of a fuel injector assembly in accordance with various embodiments.

As discussed herein, various needle/cavity/actuator combinations may be used from which to provide various fuel delivery configurations (e.g., first fuel delivery configuration 220 and second fuel delivery configuration 230), with each fuel delivery configuration providing a different amount of fuel to the cylinder 210. For example, in some embodiments, plural cavities, and plural actuators are employed. FIG. 3 illustrates an overhead plan view of aspects of a fuel injector assembly 300 in accordance with various embodiments. One or more of the depicted example aspects of the fuel injector assembly 300 may be used, for example, in connection with the fuel injector assembly 130 discussed in connection with FIGS. 1 and 2A-C. As seen in FIG. 3, the fuel injector assembly 300 includes a nozzle 310 having a plurality of cavities (first cavity 320, second cavity 322, third cavity 324, fourth cavity 326), along with a plurality of corresponding needles (first needle 330, second needle 332, third needle 334, fourth needle 336), and a plurality of corresponding actuators (first actuator 340, second actuator 342, third actuator 344, fourth actuator 346). It may be noted that the cavities 320, 322, 324, 326 are shown in a single nozzle 310 in the illustrated example; however, in various embodiments one or more of the cavities 320, 322, 324, 326 may be disposed in a dedicated nozzle having only a single cavity. The actuators 340, 342, 346, 348 in the illustrated embodiment are illustrated as solenoid coils that are disposed radially about at least a portion of a needle to be moved by a given solenoid. It may be noted that the particular arrangement shown in FIG. 3 is meant by way of example for illustrative purposes, and that other arrangements may be employed in various embodiments. For example, a diesel injector may be positioned at the center of the nozzle 310 in dual fuel embodiments.

In the illustrated embodiment, each needle is movably disposed in a corresponding cavity, and configured to be moved by a corresponding actuator. As seen in FIG. 3, the first needle 330 is disposed in the first cavity 320 and is moved by the first actuator 340; the second needle 332 is disposed in the second cavity 322 and is moved by the second actuator 342; the third needle 334 is disposed in the third cavity 324 and is moved by the third actuator 344; and the fourth needle 336 is disposed in the fourth cavity 326 and is moved by the fourth actuator 346. As discussed herein, a first amount of fuel is delivered through the nozzle openings (e.g., nozzle openings 144) with the fuel injector assembly 300 in a first fuel delivery configuration (e.g., first fuel delivery configuration 220), and a second amount of fuel is delivered through the nozzle openings (e.g., nozzle openings 144) with the fuel injector assembly 300 in a second fuel delivery configuration (e.g., second fuel delivery configuration 230). Specifically, for the depicted fuel injector assembly 300, the first fuel delivery configuration includes a first group 350 of the needles being opened (and only the first group 350 being opened), and the second fuel delivery configuration includes the first group 350 along with a second group 352 of needles being opened. For the illustrated example, the first group 350 includes the first needle 340 and the third needle 344, while the second group 352 includes the second needle 342 and the fourth needle 346. Accordingly, the first group 350 includes two needles (first needle 340 and third needle 344) that are symmetrically disposed with respect to each other (e.g., at noon and 6 o'clock positions as viewed from above), and the second group 352 includes two needles (second needle 342 and fourth needle 346) that are symmetrically disposed with respect to each other (e.g., at 3 o'clock and 9 o'clock positions as viewed from above). In some embodiments, the second group 352 may provide a relatively larger amount of fuel than the first group 350, so that an initial amount of fuel provided by the first group 350 is less than half the total amount (e.g., 10%) delivered later in a combustion cycle. It may also be noted that an additional cavity, needle, and actuator may be provided (e.g., at the center of the nozzle 310) for use for diesel fuel injection in dual fuel embodiments.

It may be noted that other numbers, arrangements, or combinations of needles to form groups may be used in various embodiments. For example, one or more groups may be formed with a single needle. As another example, more than two groups may be employed in some embodiments. Further still, different needle positions (e.g., an intermediate position for a first fuel delivery configuration and a fully opened position for a second fuel delivery configuration) may be employed for one or more given needles in various embodiments. For instance, in the above discussed example, the first needle 340 and the third needle 344 may be moved to an intermediate position for the first fuel delivery configuration, while, for the second fuel delivery configuration, the first needle 340 and third needle 344 may be moved to a more open position than the intermediate position, with the second group 352 (the second needle 342 and fourth needle 346) are also moved to an open position. In the illustrated embodiment, each needle has its own dedicated actuator; however, it may be noted that in various embodiments an actuator may be shared among two or more needles in the same group (where a group of actuators includes actuators that all open or close together), and/or one or more needles may be opened or closed by more than one actuator.

Other needle/cavity/actuator arrangements may be used in various embodiments. As one example, more than one actuator may be used to move a given needle, with a first actuator used to place the needle in the first fuel delivery configuration and a combination of two or more actuators (e.g., the first actuator along with one or more additional actuators) used to place the needle in the second fuel delivery configuration. FIGS. 4A-C provide schematic views of a fuel injector assembly 400 in different fuel delivery configurations—FIG. 4A illustrates the fuel injector assembly 400 in a closed position 410, FIG. 4B illustrates the fuel injector assembly 400 in a first fuel delivery configuration 420, and FIG. 4C illustrates the fuel injector assembly 400 in a second fuel delivery configuration 430. One or more of the depicted example aspects of the fuel injector assembly 400 may be used, for example, in connection with the fuel injector assembly 130 discussed in connection with FIGS. 1 and 2A-C. As seen in FIGS. 4A-C, the fuel injector assembly 400 includes a first coil 440 and a second coil 442 disposed around a common needle 450. The common needle 450 is disposed in a nozzle 460 having a cavity 462 in fluid communication with nozzle openings 464. Activation of the first coil 440 places the common needle 450 in the first fuel delivery configuration 420 (to allow an initial amount of fuel at the beginning of combustion), and activation of the second coil 442 along with the first coil 440 places the common needle 450 in the second fuel delivery configuration 430 (to allow an additional amount of fuel in addition to the initial amount). It may be noted that, in some embodiments, activation of the second coil 442 without activation of the first coil 440 may be used to place the common needle 450 in the second fuel delivery configuration 430, or in a different fuel delivery configuration.

As seen in FIG. 4A, with the fuel injector assembly 400 in the closed position 410, the nozzle openings 464 are closed to fluid flow from a fuel source, and a reservoir 490 in fluid communication with the nozzle openings 464 has no fuel therein. In FIG. 4B, with the first coil 440 activated (e.g., current allowed to flow through the first coil 440), the common needle 450 is in a partially open or partially lifted position (which may also be referred to as providing partial flow), and the fuel injector assembly 400 is placed in the first fuel delivery configuration 420. In the first fuel delivery configuration 420, the nozzle openings 464 are open to flow, the volume of the reservoir 490 is increased with respect to the volume of the reservoir 490 in the closed position 410, and fluid is present in the reservoir 490 for delivery via the nozzle openings 464. In FIG. 4C, with the first coil 440 and the second coil 442 activated (e.g., current allowed to flow through the first coil 440 and the second coil 442), the common needle 450 is in a fully open or maximum lift position (which may also be referred to as providing maximum flow), and the fuel injector assembly 400 is placed in the second fuel delivery configuration 430. In the second fuel delivery configuration 430, the nozzle openings 464 are open to flow, the volume of the reservoir 490 is increased with respect to the volume of the reservoir 490 in the first fuel delivery configuration 420, and fluid is present in the reservoir 490 for delivery via the nozzle openings 464. It may be noted that in various embodiments in connection with any of the figures discussed herein, one or more reservoirs utilized as discussed herein may have a different volume of fluid and/or different type of fuel for each of different fuel delivery configurations. The flow area provided by a given configuration helps govern the injection rate and the amount of time spent in an open state (along with the injection rate) governs the quantity of fuel delivered. The pressure (rail or delivery pressure) also influences the injection rate.

It may be noted that other arrangements may be utilized in alternate embodiments. For example, in some embodiments, only the first coil may be used to place the needle in the first fuel delivery configuration, and only the second coil may be used to place the needle in the second fuel delivery configuration. As another example, more than two coils may be used to provide more than two fuel delivery configurations. Further still, in some embodiments, three fuel delivery configurations may be provided with two coils—namely a first fuel delivery configuration with only the first coil activated, a second fuel delivery configuration with only the second coil activated, and a third fuel delivery configuration with both first and second coils activated.

Figure 5A:
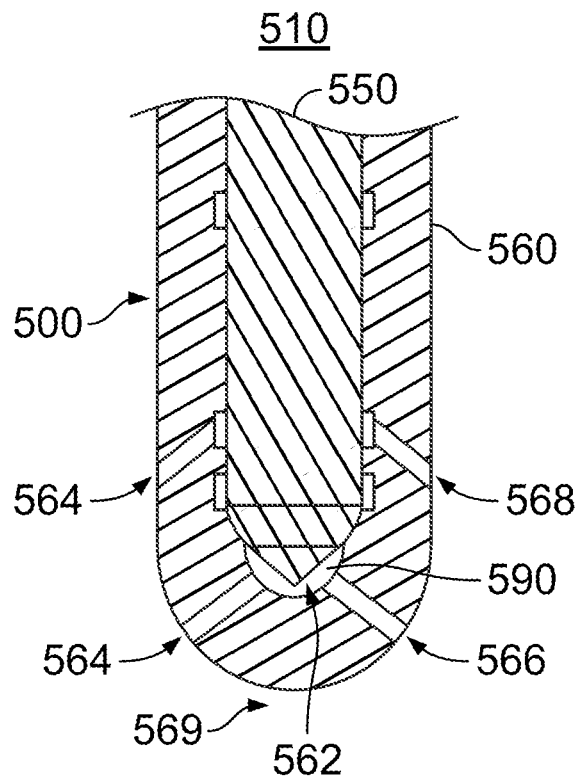
FIG. 5A illustrates a fuel injector assembly in a closed position in accordance with various embodiments.
Figure 5B:
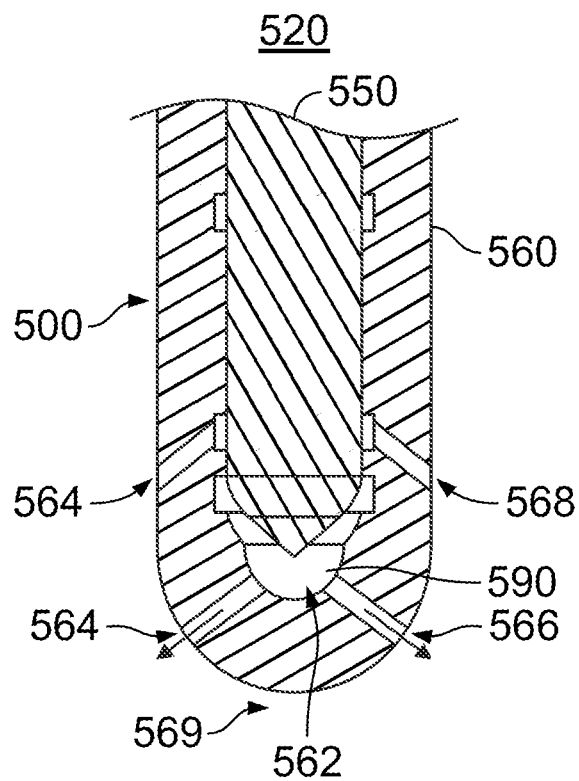
FIG. 5B illustrates the fuel injector assembly of FIG. 5A in a first fuel delivery configuration.
Figure 5C:
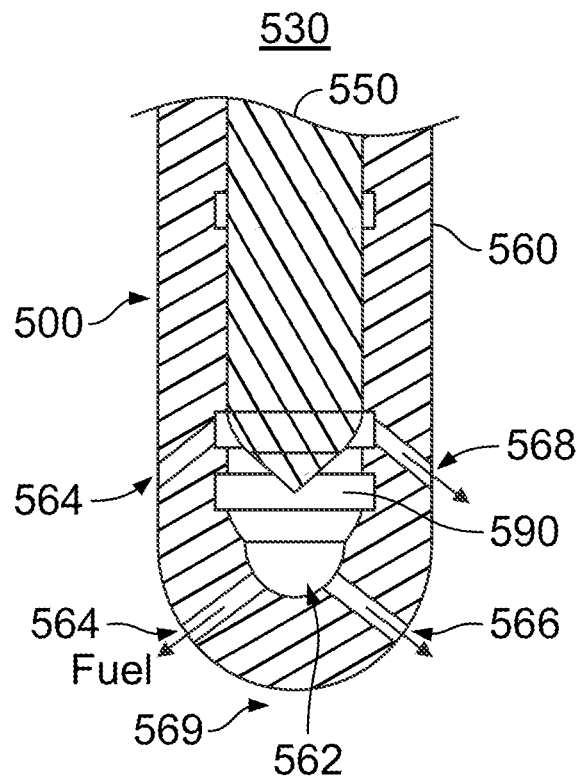
FIG. 5C illustrates the fuel injector assembly of FIGS. 5A-B in a second fuel delivery configuration.

It may further be noted that, in various embodiments, some nozzle openings may be closed to fluid flow in one fuel delivery configuration, but open to fluid flow in a different fuel delivery configuration. FIGS. 5A-C provide schematic views of a fuel injector assembly 500 in different fuel delivery configurations—FIG. 5A illustrates the fuel injector assembly 500 in a closed position 510, FIG. 5B illustrates the fuel injector assembly 500 in a first fuel delivery configuration 520, and FIG. 5C illustrates the fuel injector assembly 500 in a second fuel delivery configuration 530. One or more of the depicted example aspects of the fuel injector assembly 500 may be used, for example, in connection with the fuel injector assembly 130 discussed in connection with FIGS. 1 and 2A-C and/or the fuel injector assembly 400 discussed in connection with FIGS. 4A-C. The fuel injector assembly 500 includes a first coil and a second coil (not shown in FIGS. 5A-C, see FIGS. 4A-C for an example of first and second coils) disposed around a common needle 550. The common needle 550 is disposed in a nozzle 560 having a cavity 562 in fluid communication with nozzle openings 564. The nozzle openings 564 include a first set 566 of nozzle openings and a second set 568 of nozzle openings, with the first set 566 positioned more closely to a bottom end 569 of the nozzle 560 than is the second set 568. Activation of the first coil places the common needle 550 in the first fuel delivery configuration 520 (to allow an initial amount of fuel at the beginning of combustion), and activation of the second coil along with the first coil places the common needle 550 in the second fuel delivery configuration 530 (to allow an additional amount of fuel in addition to the initial amount). As seen in FIGS. 5B and 5C, the first set 566 of nozzle openings but not the second set 568 of nozzle openings are open to flow in the first fuel delivery configuration 520, and the first set 566 of nozzle opening and the second 568 of nozzle openings are open to flow in the second fuel delivery configuration 530. Accordingly, a first fuel delivery path may include the first set 566 of nozzle openings, while a second fuel delivery path includes both the first set 566 and the second set 568 of nozzle openings.

As seen in FIG. 5A, with the fuel injector assembly 500 in the closed position 510, the nozzle openings 564 (of both the first set 566 and the second sect 568) are closed to fluid flow from a fuel source, and a reservoir 590 in fluid communication with the nozzle openings 564 has no fuel therein. In FIG. 5B, with the first coil activated (e.g., current allowed to flow through the first coil) or the first fuel delivery configuration 520 otherwise achieved, the common needle 550 is in a partially open or partially lifted position (which may also be referred to as providing partial flow), and the fuel injector assembly 500 is placed in the first fuel delivery configuration 520. In the first fuel delivery configuration 520, with the needle 550 partially lifted but still positioned distally below the second set 568 of nozzle openings, the first set 566 of nozzle openings (but not the second set 568) are open to flow, the volume of the reservoir 590 is increased with respect to the volume of the reservoir 590 in the closed position 510, and fluid is present in the reservoir 590 for delivery via the first set 566 of nozzle openings. In FIG. 5C, with the first coil and the second coil activated (e.g., current allowed to flow through the first coil and the second coil) or the second fuel delivery configuration 530 otherwise achieved, the common needle 550 is in a fully open or maximum lift position (which may also be referred to as providing maximum flow), and the fuel injector assembly 500 is placed in the second fuel delivery configuration 530. In the second fuel delivery configuration 530, with the needle 550 fully lifted or otherwise distally above the second set 568 of nozzle openings as seen in FIG. 5C, the nozzle openings 564 of both the first set 566 and the second set 568 are open to flow, the volume of the reservoir 590 is increased with respect to the volume of the reservoir 590 in the first fuel delivery configuration 520, and fluid is present in the reservoir 590 for delivery via the nozzle openings 564 of both the first set 566 and the second set 568.

Figure 6A:
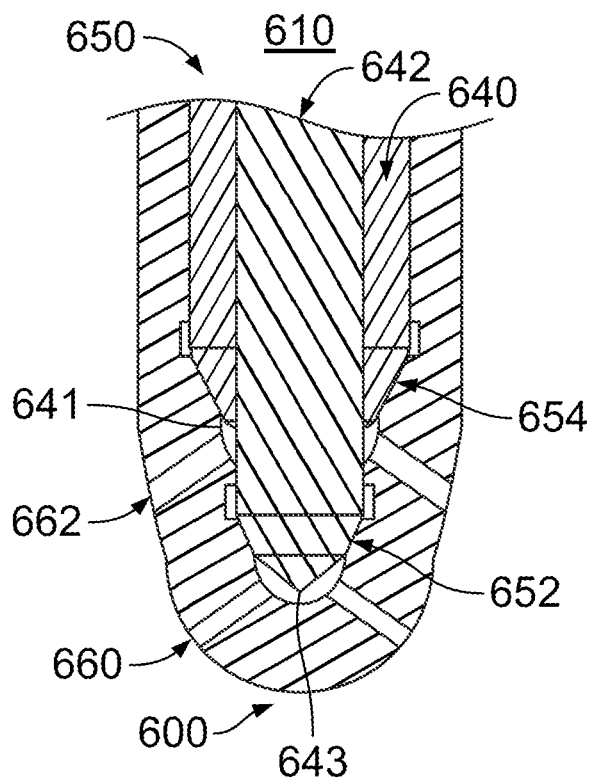
FIG. 6A illustrates a fuel injector assembly in a closed position in accordance with various embodiments.
Figure 6B:
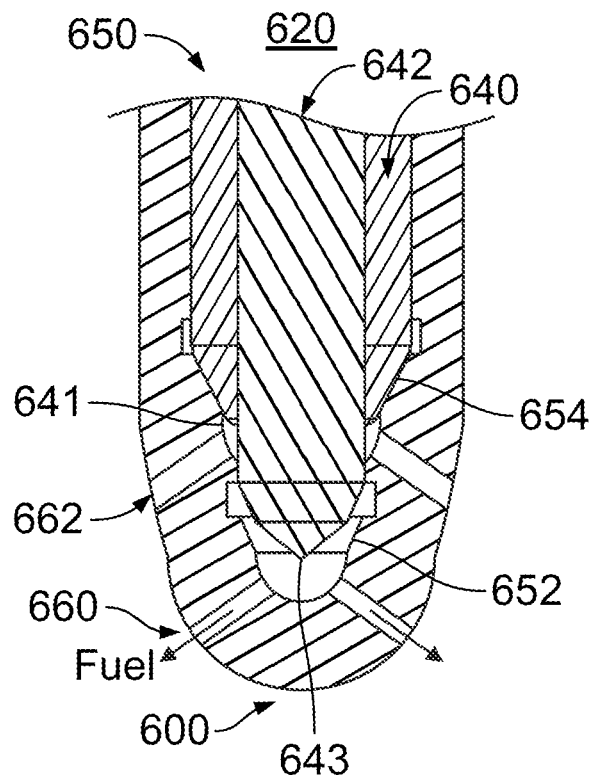
FIG. 6B illustrates the fuel injector assembly of FIG. 6A in a first fuel delivery configuration.
Figure 6C:
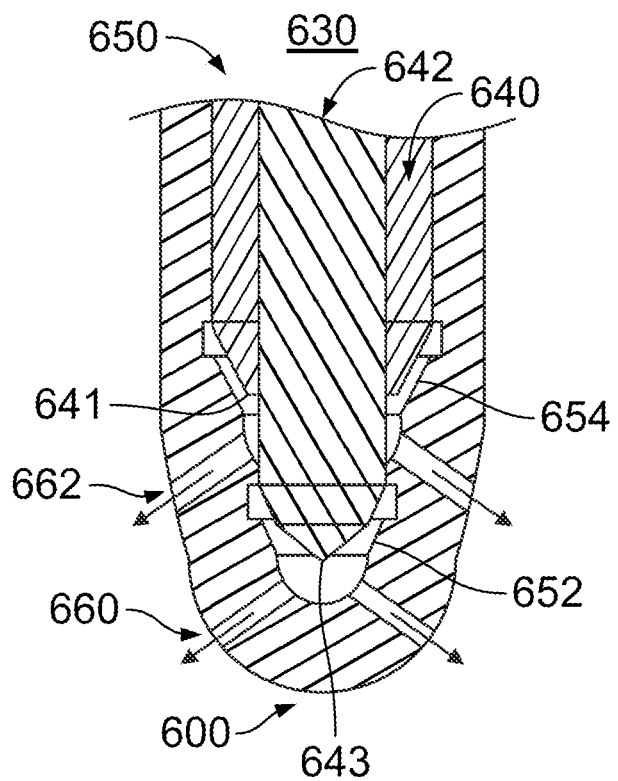
FIG. 6C illustrates the fuel injector assembly of FIGS. 6A-B in a second fuel delivery configuration.

As another example of needle/cavity/actuator arrangements that may be employed in various embodiments, more than one needle may be used in conjunction with a cavity. FIGS. 6A-C provide schematic views of a fuel injector assembly 600 in different fuel delivery configurations—FIG. 6A illustrates the fuel injector assembly 600 in a closed position 610, FIG. 6B illustrates the fuel injector assembly 600 in a first fuel delivery configuration 620, and FIG. 6C illustrates the fuel injector assembly 600 in a second fuel delivery configuration 630. One or more of the depicted example aspects of the fuel injector assembly 600 may be used, for example, in connection with the fuel injector assembly 130 discussed in connection with FIGS. 1 and 2A-C. As seen in FIGS. 6A-C, the fuel injector assembly 600 includes an outer needle 640 and an inner needle 642 disposed within a cavity 650. The outer needle 640 is movably disposed within the cavity 650, and the inner needle 642 is movably disposed within the outer needle 640 and the cavity 650. A distal tip 643 of the inner needle 642 extends distally beyond a distal tip 641 of the outer needle 640. While actuators are not depicted in the illustrated embodiment for clarity of illustration, it may be noted that the depicted inner needle 642 and outer needle 640 may be moved into and out of their respective closed positions by two separate actuators (e.g., each needle has an individual coil dedicated thereto), or by one actuator with one or two coils with different energizing strategies.

The cavity 650 includes a first needle seat 652 that accepts the inner needle 642 when the inner needle 642 is closed (e.g., as seen in FIG. 6A). In the closed position, the inner needle 642 prevents fluid delivery to a combustion chamber via first nozzle openings 660. When the inner needle 642 is lifted from the first needle seat 652 or opened (e.g., as seen in FIGS. 6B and 6C), fuel is allowed to flow through the first nozzle openings 660. The cavity 650 also includes a second needle seat 654 that accepts the outer needle 640 when the outer needle 640 is in a closed position (e.g., as seen in FIGS. 6A and 6B). In the closed position, the outer needle 640 prevents fluid delivery to a combustion chamber via second nozzle openings 662. When the outer needle 640 is lifted from the second needle seat 654 or opened (e.g., as seen in FIG. 6C), fuel is allowed to flow through the second nozzle openings 662.

In the closed position 610 (as seen in FIG. 6A), both the outer needle 640 and the inner needle 642 are closed, preventing delivery of fuel through both the first nozzle openings 660 and the second nozzle openings. When the fuel injector assembly 600 is placed in the first fuel delivery configuration 620 as seen in FIG. 6B, the outer needle 640 remains closed, but the inner needle 642 is lifted from the first needle seat 652, allowing flow through the first nozzle openings 660 but not the second nozzle openings 662, which allows a first amount of fuel to be delivered (e.g., an initial amount for the beginning of combustion). When the fuel injector assembly 600 is placed in the second fuel delivery configuration 630 as seen in FIG. 6C, the outer needle 640 is lifted from the second needle seat 654, allowing flow through the second nozzle openings 662, and the inner needle 642 is lifted from the first needle seat 652, allowing flow through the first nozzle openings 660 as well as the second nozzle openings 662, which allows a second amount of fuel to be delivered (via the second nozzle openings 662) along with the first amount of fuel to be delivered (via the first nozzle openings 660).

In the illustrated embodiment, only one of the inner needle 642 and the outer needle 640 is opened (in FIG. 6B, the inner needle 642 is opened) and the other is closed in FIG. 6B, the outer needle 640 is closed) in the first fuel delivery configuration 620, and both the inner needle 642 and the outer needle 640 are open in the second fuel delivery configuration 630 (see FIG. 6C.) Other arrangements or combinations may be used in different embodiments. For example, in some embodiments, the first fuel delivery configuration may be achieved by lifting the outer needle while the inner needle remains closed. As another example, in various embodiments, one or both of the inner or outer needles may be moved to an intermediate position as part of the first fuel delivery configuration, with both the inner and outer needles fully opened in the second fuel delivery configuration. Accordingly, in various embodiments, a first fuel path may be defined with one of the inner needle and outer needle opened and the other closed, and a second fuel path may be defined with both the inner needle and outer needle opened. Further, one or both of the inner or outer needles may have intermediate positions and/or continuous adjustment to provide additional fuel delivery configurations (e.g., more than two fuel delivery configurations) and/or to improve control or adjustability of the amount of fuel delivered.

Returning to FIG. 1, the processing unit 120 of the illustrated embodiment is configured to control various aspects of the system 100, including the actuator 160 (e.g., to control the positioning of one or more needles 150 to place the fuel injector assembly 130 in a desired fuel delivery configuration at a desired time). The processing unit 120 provides control signals to one or more aspects of the system 100. For example, the processing unit 120 controls the activation and deactivation of the actuator 160. The processing unit 120 in various embodiments controls the actuator to perform or provide different movements of one or more needles to or between fuel delivery configurations. The movements to or from fuel delivery configurations (e.g., the timing of use of fuel delivery configurations relative to combustion events) in various embodiments is controlled by the processing unit 120 to provide desired rate shaping of fuel delivery. In some embodiments, the processing unit 120 controls one or more actuators to move needles between positions of a range of available positions for a given fuel delivery configuration (or configurations) for more precise control and/or adjustment. The processing unit 120 in various embodiments receives feedback from one or more sensors (e.g., sensor 170) configured to detect one or more parameters of the system 100.

For example, in the illustrated embodiment, sensor 170 is operably coupled to the processing unit 120. The depicted sensor 170 is in fluid communication with the exhaust stream 103 from the cylinder 112, but may be located in alternate locations. For example, the sensor 170 may be in communication with one or more of the combustion chamber, fuel injector, or fuel system additionally or alternatively. More than one sensor may be used in various embodiments. In the depicted example, the sensor 170 may detect or determine (or provide information from which one or more parameter values may be determined) temperature of an exhaust gas (e.g., temperature entering an after-treatment device), or the presence or amount of one or more materials in the exhaust stream 130. The sensor 170, for example, may include one or more of a pressure sensor (e.g., a cylinder pressure sensor and/or fuel rail pressure sensor), a power sensor, a torque sensor, a speed sensor, a crank angle position sensor, a needle lift sensor, a temperature sensor, a strain gage, a knock sensor, a NOx sensor, an Oxygen sensor, a Carbon soot sensor, a Particulate Matter (PM) sensor, or a Hydrocarbons (unburned or partially burned) sensor, among others. It may be noted that a combination of one or more of the above (or other) sensors may be employed in various embodiments. The processing unit 120 is configured to control at least one of moving the needle 150 (and/or other needles) to a first fuel delivery configuration or moving the needle 150 (and/or other needles) to a second fuel delivery configuration based on feedback provided from the sensor 170. The moving of a given needle may be controlled by controlling or adjusting the timing of a start of movement of the needle relative to a combustion event (e.g., beginning of combustion), controlling or adjusting a speed of movement of the needle, and/or controlling or adjusting the amount of time the needle remains at a given position. Such control of needle movement, carried out precisely, may be used to provide a desired rate of fuel injection into the engine cylinder (which is referred to as "injection rate shaping").

It may be noted that different types of movements to or between fuel delivery configurations may be employed. For example, moving the needle 150 (and/or other needles) to the first fuel delivery configuration and/or the second fuel delivery configuration (as well as moving the needle 150 and/or other needles to a closed position) may include moving the needle 150 (and/or other needles) in a series of steps. As another example, the needle 150 (and/or other needles) may be continuously moved (e.g., using a continuously variable/controllable solenoid actuator). As one more example, moving the needle 150 (and/or other needles) to the first fuel delivery configuration and/or the second fuel delivery configuration (as well as moving the needle 150 and/or other needles to a closed position) may include moving the needle 150 (and/or other needles) in a series of discrete pulses (e.g., periods of movement interposed between periods of stationary positioning).

The depicted processing unit 120 includes processing circuitry configured to perform one or more tasks, functions, or steps discussed herein. The processing unit 120 of the illustrated embodiment is configured to perform one or more aspects discussed in connection with the methods or process flows disclosed herein. It may be noted that "processing unit" as used herein is not intended to necessarily be limited to a single processor or computer. For example, in various embodiments, the processing unit 120 may include multiple processors and/or computers, which may be integrated in a common housing or unit, or which may be distributed among various units or housings. It may be noted that operations performed by the processing unit 120 (e.g., operations corresponding to process flows or methods discussed herein, or aspects thereof) may be sufficiently complex that the operations may not be performed (e.g., performed sufficiently precisely, accurately, and/or repeatedly) by a human being within a reasonable time period.

In the illustrated embodiment, the processing unit 120 includes a memory 122. It may be noted that, additionally, other types, numbers, or combinations of modules may be employed in alternate embodiments. Generally, the various aspects of the processing unit 120 act individually or cooperatively with other aspects to perform one or more aspects of the methods, steps, or processes discussed herein. The memory 122 includes one or more computer readable storage media. Further, in various embodiments, the process flows and/or flowcharts discussed herein (or aspects thereof) represent one or more sets of instructions that are stored in the memory 122 for directing operations of the system 100.

Figure 7:
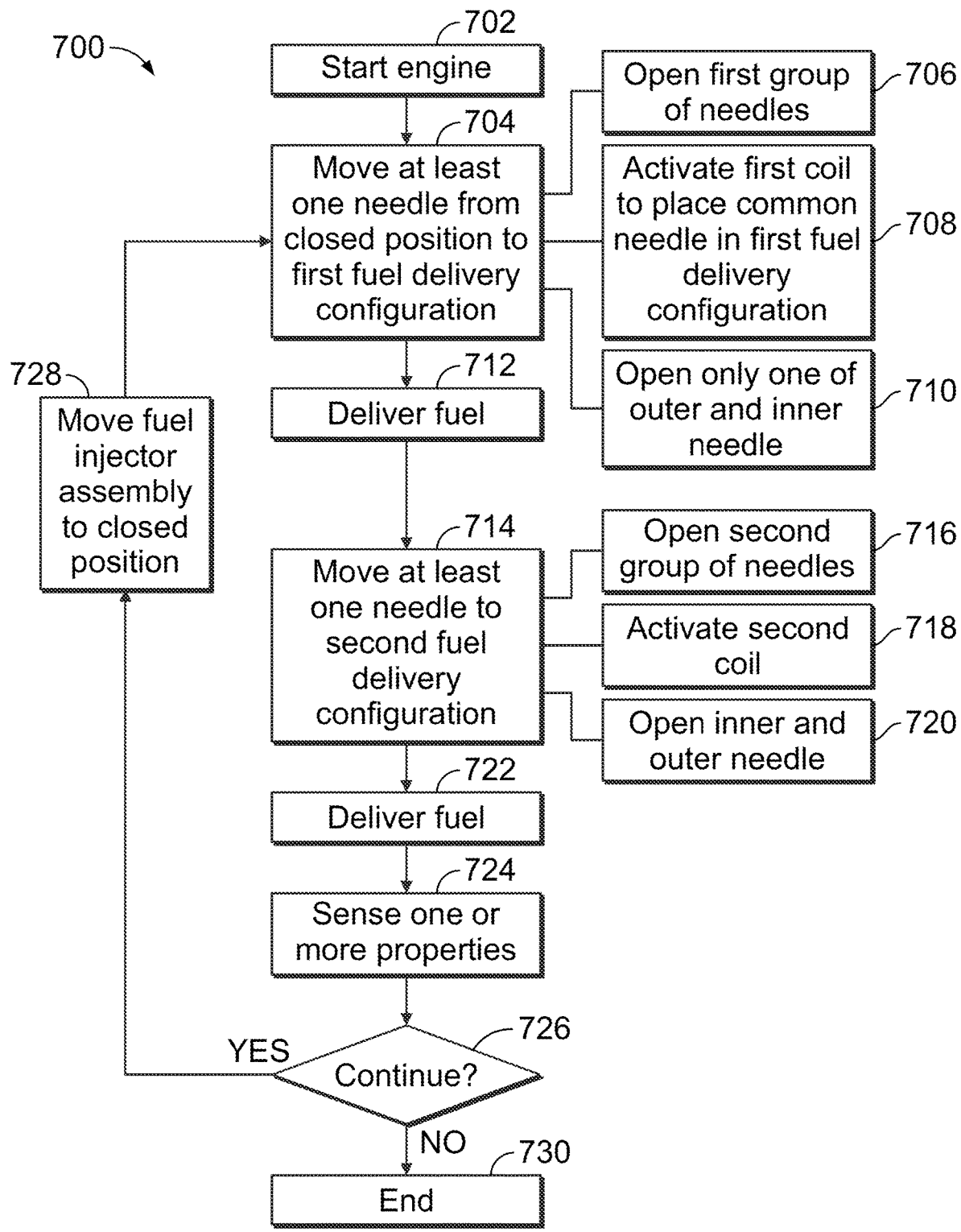
FIG. 7 provides a flowchart of a method for operating an engine in accordance with various embodiments.

FIG. 7 provides a flowchart of a method 700 for operating an engine (e.g., a reciprocating internal combustion engine) in accordance with various embodiments. In various embodiments, the method 700, for example, employs structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 700 are used as one or more algorithms to direct hardware to perform operations described herein. In various embodiments, one or more processors (e.g., processing unit 120) uses portions, aspects, and/or variations of the method 700 as one or more algorithms for engine control.

At 702, an engine is started. In the depicted embodiment, the engine is a reciprocating fuel-injected internal combustion engine. In some embodiments, the engine may be a compression ignition engine (e.g., using diesel fuel at least during a beginning of a combustion cycle), while in other embodiments the engine may be a spark ignition engine, while in still other embodiments the engine may use other sources of ignition such as laser, plasma, or other sources of ignition, to initiate combustion in the engine cylinder. In various embodiments, the engine may use one or more of gasoline, diesel, or natural gas (liquid and/or gaseous). In the illustrated example, the engine includes a cylinder having at least one fuel injector assembly configured to deliver fuel to the cylinder, with the fuel injector assembly having at least one actuator configured to move at least one needle to open and close the fuel injector as well as move the fuel injector to or between different fuel delivery configurations to deliver variable amounts of fuel. The depicted method 700, for example, may be used to provide rate shaping of fuel delivery such that an initial amount of fuel provided at the beginning of combustion is less than a later amount of fuel provided later during combustion. It may be noted that method 700 may be used to continuously control and/or vary the time-rate of injection of either a first fuel or a second fuel, or both first and second fuels, thereby providing a wide range of flexibility for rate shaping the injection of fuels.

At 704, at least one needle within at least one cavity of the engine is moved from a closed position (where fluid is prevented from flowing through openings of a nozzle and fuel is not delivered) to a first fuel delivery configuration. In the first fuel delivery configuration, a first amount of fuel is delivered through openings of the nozzle. The first amount in various embodiments is an amount configured for use at the beginning of combustion. The at least one needle is moved with at least one actuator, for example a solenoid coil under control of at least one processor (e.g., processing unit 120). In various embodiments, different cavity/needle/actuator combinations, as well as different numbers of fuel injector assemblies, may be used to provide the first fuel delivery configuration (as well as other fuel delivery configurations).

For example, at 706, in some embodiments, the at least one cavity includes a plurality of cavities, the at least one needle includes a plurality of corresponding needles, and the at least one actuator includes a plurality of corresponding actuators. Each needle is movably disposed within a corresponding cavity. To move the at least one needle to the first fuel delivery configuration, a first group of needles is opened.

As another example, at 708, the at least one actuator includes a first coil and a second coil disposed around a common needle. Moving the at least one needle to the first fuel delivery configuration includes activating the first coil to place the common needle in the first fuel delivery configuration.

As one more example, at 710, the at least one needle includes an outer needle and an inner needle, with the inner needle movably disposed within the outer needle (e.g., at least a portion of the inner needle is radially surrounded by the outer needle). Moving the at least one needle to the first fuel delivery configuration includes opening only one of the inner needle and the outer needle (e.g., opening the inner needle with a first solenoid coil while the outer needle remains closed).

At 712, fuel is delivered with the fuel injector assembly (or assemblies) in the first fuel delivery configuration. Fuel may be delivered from the first fuel delivery configuration at and/or near the beginning of combustion. In some embodiments, fuel may be delivered from the first fuel delivery configuration during an intake phase of a combustion cycle during which a piston is lowered and air provided to a combustion chamber of the cylinder. In some embodiments, fuel may be delivered concurrently with one or more fuel injectors moving to or from a position of the first fuel delivery configuration, and/or at different positions of a range of positions of the first fuel delivery configuration, for example to provide adjustability.

At 714, the at least one needle within the at least one cavity of the engine is moved from the first fuel delivery configuration to a second fuel delivery configuration. In the second fuel delivery configuration, a second amount of fuel along with the first amount of fuel is delivered through the openings of the nozzle. The first amount and second amount in various embodiments provide a combined amount configured for use later in combustion that is more than the first amount provided by the first fuel delivery configuration. The at least one needle is moved from the first fuel delivery configuration with at least one actuator, which may include one or more actuators used in moving from the closed position to the first fuel delivery configuration, and/or may include one or more other actuators. In some embodiments, the nozzle includes a first set of nozzle openings and a second set of nozzle openings. The first set, but not the second set, of nozzle openings may be open to flow in the first fuel delivery configuration, while the first and second set of nozzle opening are open to flow in the second fuel delivery configuration.

For example, at 716, in some embodiments (e.g., embodiments for which step 706 was performed), the at least one cavity includes a plurality of cavities, the at least one needle includes a plurality of corresponding needles, and the at least one actuator includes a plurality of corresponding actuators. Each needle is movably disposed within a corresponding cavity. To move the at least one needle to the second fuel delivery configuration, a second group of needles is opened along with the first group of needles that was opened at 706.

As another example, at 718, in some embodiments (e.g., embodiments for which step 708 was performed), the at least one actuator includes a first coil and a second coil disposed around a common needle. Moving the at least one needle to the second fuel delivery configuration includes activating the second coil along with the first coil to place the common needle in the second fuel delivery configuration. It may be noted that in some embodiments, the first coil may be de-activated and the second coil activated to provide the second fuel delivery configuration.

As one more example, at 720 in some embodiments (e.g., embodiments for which step 710 was performed), the at least one needle includes an outer needle and an inner needle, with the inner needle movably disposed within the outer needle (e.g., at least a portion of the inner needle is radially surrounded by the outer needle). Moving the at least one needle to the second fuel delivery configuration includes opening both the inner needle and the outer needle (e.g., opening the outer needle with a second solenoid coil while the inner needle remains open from step 710). It may be noted that, in alternate embodiments, only one needle may be opened to achieve the second fuel delivery condition. For example, a needle that was opened at 710 may be closed and a different needle is opened (e.g., an inner needle opened while an outer needle is closed at 710, and an outer needle opened while an inner needle is closed at 720). In some embodiments, two needles may be used to provide three configurations—one configuration with only a first of the two needles opened, a second configuration with only a second of the two needles opened, and a third configuration with both needles opened. It may further be noted that when two needles are opened, they may be opened in sequence (e.g., a first needle opened and then a second needle opened, with no overlap in time of opening of the individual needles), or may be opened simultaneously or concurrently (e.g., with partial or complete overlap in time of opening of the individual needles).

At 722, fuel is delivered from the second fuel delivery configuration. Fuel may be delivered from the second fuel delivery configuration after ignition. Because the second fuel delivery configuration provides a second amount of fuel in addition to the first amount of fuel, more fuel is delivered (and/or a rate of fuel delivery is increased) at 722 than at 712. In some embodiments, fuel may be delivered concurrently with one or more fuel injectors moving to or from a position of the second fuel delivery configuration (e.g., while moving from the first fuel delivery configuration to the second fuel delivery configuration), and/or at different positions of a range of positions of the second fuel delivery configuration, for example to provide adjustability. It may be noted that, in some embodiments, the movement to or from either the first fuel delivery configuration and/or the second fuel delivery configuration may be accomplished in a series of steps, or, as another example, in a series of discrete pulses. It may further be noted that, in various embodiments, the fuel may be liquid and gaseous at various different times, and the method 700 may be employed to control rate shaping differently for each of liquid and gaseous operating modes. Further still, it may be noted that in various embodiments, the amount of fuel delivered at one or more fuel delivery configurations may be modified by adjusting a position of one or more needles while in the given fuel delivery configuration. Accordingly, adjustments to the amount of fuel or rate of fuel delivery may be controlled, for example, to achieve better combustion phasing, maintain the pressure rise rate under control, and/or optimize overall engine performance and emissions.

At 724, one or more properties or aspects of engine operation are sensed using one or more sensors. In various embodiments, one or more parameters are sensed to confirm, re-tune, or re-configure the movement of one or more needles at 704 and/or 714. For example, in some embodiments, one or more properties of an exhaust stream from the engine is sensed using a sensor. Feedback from the sensor, for example, may be used to control movement of the at least one needle to the first fuel delivery configuration and/or the second fuel delivery configuration. For example, based on the one or more sensed properties (e.g., pressure/temperature/flow of the exhaust stream, torque, instantaneous power generated, knock sensor output, constituents of exhaust gas (such as NOx, Oxygen, Carbon soot, Particulate Matter, Hydrocarbons (unburned or partially burned), or the like)), the amount of fuel delivered at one or more fuel delivery configurations may be adjusted (e.g., as determined by at least one processor such as processing unit 120) to improve performance. It may be noted that, additionally or alternatively, in-cylinder conditions may be sensed, an aspect of the operation of one or more fuel injectors may be sensed, and/or an aspect of the operation of a fuel system may be sensed. For example, parameters such as fuel rail pressure and/or needle lift may be sensed. In various embodiments, an ECU recommended (or calibration commanded) parameter value may be compared to a sensed parameter value, and the difference used to drive corrective actions to movements of injector needles.

At 726, it is determined if the engine is to keep operating for additional combustion cycles. If so, the method 700 proceeds to 728, where the fuel injector assembly (or assemblies) of the engine are moved to the closed position, and the nozzle (or nozzles) of the fuel injector assemblies is closed, for example, after a desired total amount of fuel has been released, and during an exhaust portion of a combustion cycle. If the engine is to be stopped, the method 700 terminates at 730.

In some embodiments, fuel injector assemblies disclosed herein may be used in connection with multi-fuel systems (e.g., systems that use more than one type of fuel). For example, a combustion engine may utilize a mixture of two types of fuel. Various embodiments disclosed herein provide for accurate control and/or changing of the proportion of two or more fuels used by a combustion engine.

Figure 8:
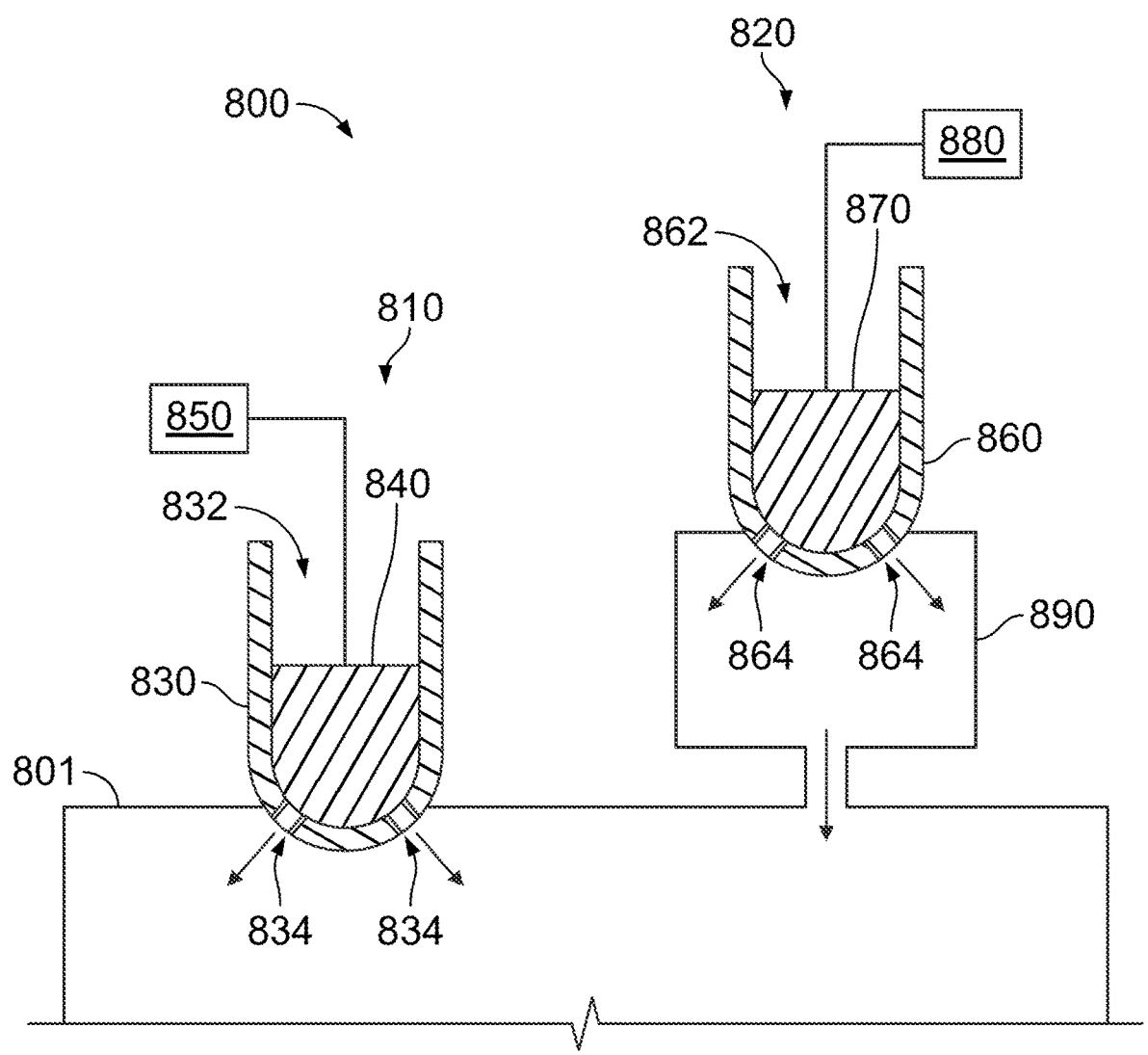
FIG. 8 is a schematic block diagram of a multi-fuel injector assembly in accordance with various embodiments.

For example, FIG. 8 is a schematic block diagram of a multi-fuel injector assembly 800 formed in accordance with various embodiments. In the illustrated example, the multi-fuel injector assembly is discussed in the context of a dual-fuel system that utilizes two different types of fuels, each associated with a corresponding fuel injector assembly (or fuel delivery system) configured for use with that particular type of fuel. However, it may be noted that the multi-fuel injector assembly in other embodiments may use more than two different types of fuels and/or use more than two fuel injector assemblies (or other fuel delivery assemblies).

In the example illustrated in FIG. 8, the multi-fuel injector assembly includes a first fuel injector assembly 810, and a second fuel delivery system 820. The first fuel injector assembly is configured to deliver a first type of fuel, and the second fuel delivery system is configured to deliver a second, different type of fuel. The first fuel injector assembly and second fuel delivery system in various embodiments are configured to control the proportion of first type of fuel and second type of fuel, respectively, delivered to a cylinder 801. For example, the ratio between the first type of fuel and second type of fuel may be varied to address different operating conditions and/or varying availability of one or more types of fuels. The first fuel injector assembly and the second fuel delivery assembly may be controlled by one or more processors (e.g., processing unit 120 discussed in connection with FIG. 1.)

As seen in FIG. 8, the first fuel injector assembly includes a first nozzle 830, at least one first needle 840, and at least one first actuator 850. Generally, the first fuel injector assembly in various embodiments incorporates one or more aspects of fuel injector assemblies discussed in connection with FIGS. 1-7. For example, in the embodiment illustrated in FIG. 8, the first nozzle includes at least one first cavity 832 that is in fluid communication with first nozzle openings 834. Various numbers of first cavities and first nozzle openings may be utilized in various embodiments. In the illustrated example, one first cavity is shown. Generally, the first type of fuel for is provided to a cylinder (either directly or indirectly) via passage through the first nozzle openings. If the flow through the first nozzle openings is completely blocked, the first type of fuel will not be delivered to the cylinder.

In the example illustrated in FIG. 8, only one first needle is shown. However, it may be noted that additional first needles may be used in various embodiments. The depicted first needle is movably disposed within the first cavity. When the first needle is in a closed position of the first fuel injector assembly as shown in FIG. 8, flow of the first type of fuel through the first nozzle openings is prevented. The first needle may be moved from the closed position to allow a controlled amount of the first type of fuel to pass through the first nozzle openings.

The illustrated example of FIG. 8 also shows one first actuator. It should be noted, however, that additional actuators may be employed in various embodiments. The depicted first actuator is configured to move the at least one first needle within the first cavity. By moving the first needle, the first actuator controls the amount of first fuel provided (e.g., over a given amount of time) and/or the rate at which the first fuel is provided from the first fuel injector assembly. The depicted first actuator moves the first needle between various positions corresponding to different fuel delivery configurations for the first fuel injector assembly. For example, the first actuator moves the first needle to a first delivery configuration that corresponds to a first fuel mixture composition, and also to a second fuel delivery configuration that corresponds to a second fuel mixture composition. Additional fuel delivery configurations and fuel mixture compositions may be used in various embodiments. Each fuel mixture composition specifies a particular percentage or proportion of each type of fuel being utilized. For example, in the illustrated example, the first fuel mixture composition may include X % of the first type of fuel and (100−X) % of the second type of fuel, and the second fuel mixture composition may include Y % of the first type of fuel and (100−Y) % of the second type of fuel, where X and Y are within the range 0 to 100, and are different from each other. A first amount of the first type of fuel is delivered through the first nozzle openings with the first needle in the first fuel delivery configuration, and a second amount of the first type of fuel is delivered through the first nozzle openings with the first needle in the second fuel delivery configuration. An amount of fuel provided or delivered as used herein may be understood as including a volumetric amount, a specified amount over a period of time, and/or a specified rate at which fuel is provided.

Various different arrangements and techniques for providing different fuel delivery configurations that may be utilized by the first fuel injector assembly of FIG. 8 are discussed in connection with FIGS. 1-7. For example, as also discussed in further detail in connection with FIGS. 4A-4C, the first actuator may include a first coil and a second coil disposed around a common needle, with activation of the first coil placing the common needle in the first fuel delivery configuration, and activation of the coil along with or instead of the first coil placing the common needle in the second fuel delivery configuration. As another example, as discussed in further detail in connection with FIGS. 5A-5C, the first nozzle in some embodiments includes a first set of nozzle openings and a second set of nozzle openings. The first set of nozzle openings but not the second set of nozzle openings are open to flow in the first fuel delivery configuration, and the first set of nozzle openings and the second set of nozzle openings are open to flow in the second fuel delivery configuration. As one more example, as discussed in further detail in connection with FIGS. 6A-6C, the first needle may include an outer needle and an inner needle that is movably disposed in the outer needle. Other arrangements may be used in alternate embodiments.

The second fuel delivery system may be arranged generally similar to the first fuel injector assembly (e.g., including aspects discussed in connection with FIGS. 1-7), or, alternatively may be differently arranged (e.g., using various different known, conventional fuel injector components and/or arrangements). As another example, in some embodiments, the second fuel delivery system includes one or more carburetors. The second fuel delivery system may deliver fuel directly to the cylinder (e.g., similarly to the first fuel injector assembly depicted in FIG. 8), or, in other embodiments, deliver fuel indirectly to the cylinder. In the illustrated example, the second fuel delivery system delivers fuel indirectly to the cylinder, by first providing the fuel to an intake assembly 890. The depicted intake assembly receives fuel from the second fuel delivery system and provides the received fuel, along with an intake stream of air, to the cylinder. The intake assembly in various embodiments includes one or more of a conduit, an intake manifold, or an intake port (e.g., a port formed in a cylinder head). The second fuel delivery system may provide the fuel to the intake assembly in different locations. For example, the second fuel delivery system may include a port injector that injects fuel into an intake port of a cylinder. As another example, the second fuel delivery system may include a shared central injector or carburetor that is used in connection with a bank of multiple cylinders. The second fuel delivery system may use an open/close valve in some embodiments, or a variable flow continuous flow valve in others. As another example, the second fuel delivery system may vary pressure to control the flow of the second type of fuel.

The depicted second fuel delivery system includes a second nozzle 860, at least one second needle 870, and at least one second actuator 880. The example second fuel delivery system includes a single second nozzle, a single second needle, and a single second actuator. It should be noted that different numbers of one or more components may be used in alternate embodiments. Further, it may be noted that while the depicted injectors use needles, in other embodiments a poppet or other device may be used to open and close a valve.

The depicted second nozzle includes at least one second cavity 862 (one is shown in FIG. 8 but additional second cavities may be employed in different embodiments) that is in fluid communication with second nozzle openings 864. The second type of fuel is provided to the cylinder (either directly or indirectly) through the second nozzle openings. For example, in some embodiments, the second nozzle openings are in fluid communication with an intake assembly or port and the second fuel is provided from the second fuel delivery system to the intake assembly or port where the second fuel is allowed to mix with air before being provided from the intake assembly to the cylinder.

The second needle is movably disposed with the second cavity. In FIG. 8, the second needle is shown in a closed position of the second fuel delivery system in which the second needle prevents flow through the second nozzle openings. The second needle may be moved to different positions other than the closed position to provide a controlled amount of the second type of fuel. The second actuator is configured to move the second needle within the second cavity (e.g., move the second needle to a predetermined position to provide a desired amount of the second type of fuel, and/or move the second needle to the closed position of the second fuel delivery system to prevent delivery of the second type of fuel).

In various embodiments, the second fuel delivery system (e.g., position of the second needle) is controlled in conjunction with the first fuel injector assembly (e.g., position of the first needle) to provided desired amounts of each type of fuel in proportion to each other to achieve a desired fuel mixture composition (e.g., a fuel mixture including a desired percentage of the first type of fuel and a desired percentage of the second type of fuel).

Accordingly, as discussed herein, the multi-fuel injector assembly is controlled in various embodiments to provide different fuel mixtures (e.g., mixtures that contain different amounts or proportions of two or more fuels). For example, as also discussed above, the first fuel injector assembly and the second fuel delivery system may be controlled to provide a first fuel mixture composition (which includes X % of the first type of fuel and (100−X) % of the second type of fuel), and then controlled (e.g., the first and second actuators controlled to move the first and second needles, respectively) to provide a second fuel mixture composition (which includes Y % of the first type of fuel and (100−Y) % of the second type of fuel). As indicated above, X and Y are within the range 0 to 100, and are different from each other.

It should be noted that in various embodiments, X or Y may be 0 or 100. One of the first fuel injector assembly or the second fuel delivery system may be placed in the closed position to prevent flow (or provide 0%) of a given type of fuel for various fuel delivery configurations. For example, the first fuel mixture composition may be 100% of the first type of fuel, with the second fuel delivery system in the closed position of the second fuel delivery system when the first fuel injector assembly is in the first fuel delivery configuration corresponding to the first fuel mixture composition. Similarly, the second fuel mixture composition may include 100% of the second type of fuel, with the first fuel injector assembly in the closed position when the first fuel injector assembly is in the second delivery fuel delivery configuration corresponding to the second fuel mixture composition. Put another way, the second fuel delivery configuration of the first fuel injector assembly may be the closed position when the second fuel mixture composition is 100% of the second type of fuel. It may be further noted that the multi-fuel injector assembly may have multiple fuel delivery configurations where the second needle is in the closed position for each, with composition for each at 100% of the first type of fuel, and only the total amount (or rate) of first fuel delivered varied between the configurations based on the position of the at least one first needle of the first fuel injector assembly. Similarly, the multi-fuel injector assembly may have multiple fuel delivery configurations where the first needle is in the closed position for each, with composition for each at 100% of the second type of fuel, and only the total amount (or rate) of second fuel delivered varied between the configurations based on the position of the at least one second needle of the second fuel delivery system. In other fuel delivery configurations, both the first needle and second needle are away from their closed positions, and a non-zero amount of each type of fuel is delivered. The particular fuel mixture composition chosen may be selected based on desired engine performance (e.g., the fuel mixture composition may be varied based on engine speed and or engine power) and/or available amounts of fuel.

In some embodiments, the first type of fuel may be used to facilitate ignition. In some embodiments, the first type of fuel is diesel fuel. Further, in some embodiments the second type of fuel includes at least one of hydrogen, ethanol, methanol, gasoline, diesel, ammonia, natural gas, or methane.

Figure 9:
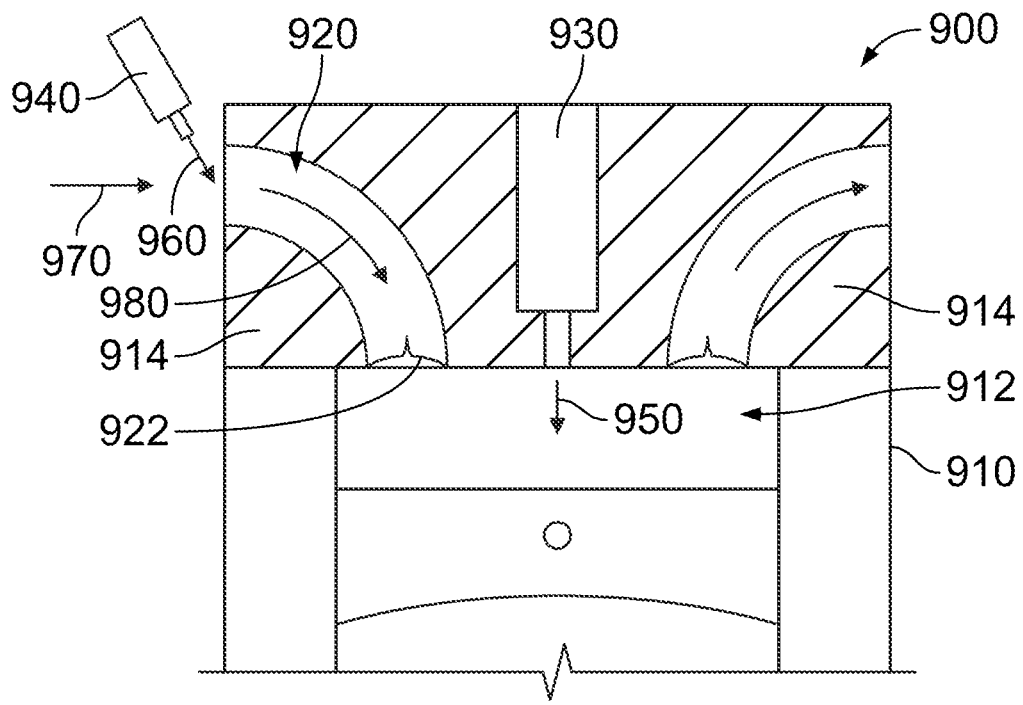
FIG. 9 is a schematic block diagram of an engine system in accordance with various embodiments.

As discussed above, in some embodiments, the first fuel injector assembly and second fuel delivery system both provide fuel directly to a cylinder. In other embodiments, one or both fuel injector assemblies provide fuel indirectly to a cylinder (e.g., via an intake assembly). FIG. 9 illustrates an embodiment of an engine assembly 900 that utilizes fuel initially provided into an intake assembly.

As seen in FIG. 9, the depicted engine assembly includes a cylinder 910, an intake assembly 920, a first fuel injector assembly 930, and a second fuel delivery system 940. In the illustrated embodiment, the intake assembly includes an intake port into which fuel is injected directly. However, as also discussed above, other types of fuel delivery (e.g., carburetion) and/or other locations of fuel delivery for the second type of fuel may be employed. Various aspects of the system of FIG. 1 and/or the multi-fuel injector assembly of FIG. 8 may be incorporated into the engine assembly of FIG. 9. For example, the first fuel injector assembly of FIG. 9 may incorporate all or a portion of the first fuel injector assembly of FIG. 8, and the second fuel delivery system of FIG. 9 may incorporate all or a portion of the second fuel delivery system of FIG. 8. Generally, the first fuel injector assembly provides a first fuel stream 950 of a first type of fuel directly to the cylinder (e.g., directly into a combustion chamber 912 of the cylinder), and the second fuel delivery system provides a second fuel stream 960 indirectly to the cylinder via the intake assembly. Combustion in the cylinder is used to provide work output (e.g., at a crank shaft). In the illustrated embodiment, an inlet stream 970 of air is provided via the intake assembly, with the inlet stream of air combining with the second fuel stream to provide a fuel-air mixture 980 that is provided to the combustion chamber of the cylinder (e.g., via an intake valve). Injection of fuel into an intake assembly or aspect thereof (e.g., port) in various embodiments allows for use of lower pressure injectors for the second fuel delivery system.

As seen in FIG. 9, the intake assembly is operably coupled in fluid communication with the cylinder to provide air to the cylinder. In some embodiments, the intake assembly may be formed as or include a port formed in the cylinder (e.g., within a cylinder head 914), with flow from the intake assembly to the combustion chamber controlled by an intake valve 922. The first fuel injector assembly, which is configured to deliver a first type of fuel directly to the cylinder, is positioned toward an upper portion of the cylinder in the illustrated example. However, it may be noted that the first fuel injector assembly may be positioned elsewhere, for example along a side of the cylinder for embodiments using opposed pistons in a common cylinder. The second fuel delivery system, which is configured to deliver a second type of fuel to the intake assembly, is positioned proximate to and in fluid communication with the intake assembly at a position upstream of the cylinder. The first type of fuel, which is provided directly to the cylinder, in various embodiments is utilized to facilitate ignition in the combustion chamber, and may be, for example, diesel. The second type of fuel, provided via the intake assembly, in various embodiments includes one or more of hydrogen, ethanol, methanol, gasoline, ammonia, natural gas, or methane. Accordingly, the engine assembly of FIG. 9 provides for injection of a first type of fuel for ignition directly into cylinder, and injection of a second type of fuel into intake assembly for improved mixing with air before combustion, with accurate and versatile metering of fuel via the fuel injector assemblies.

Figure 10:
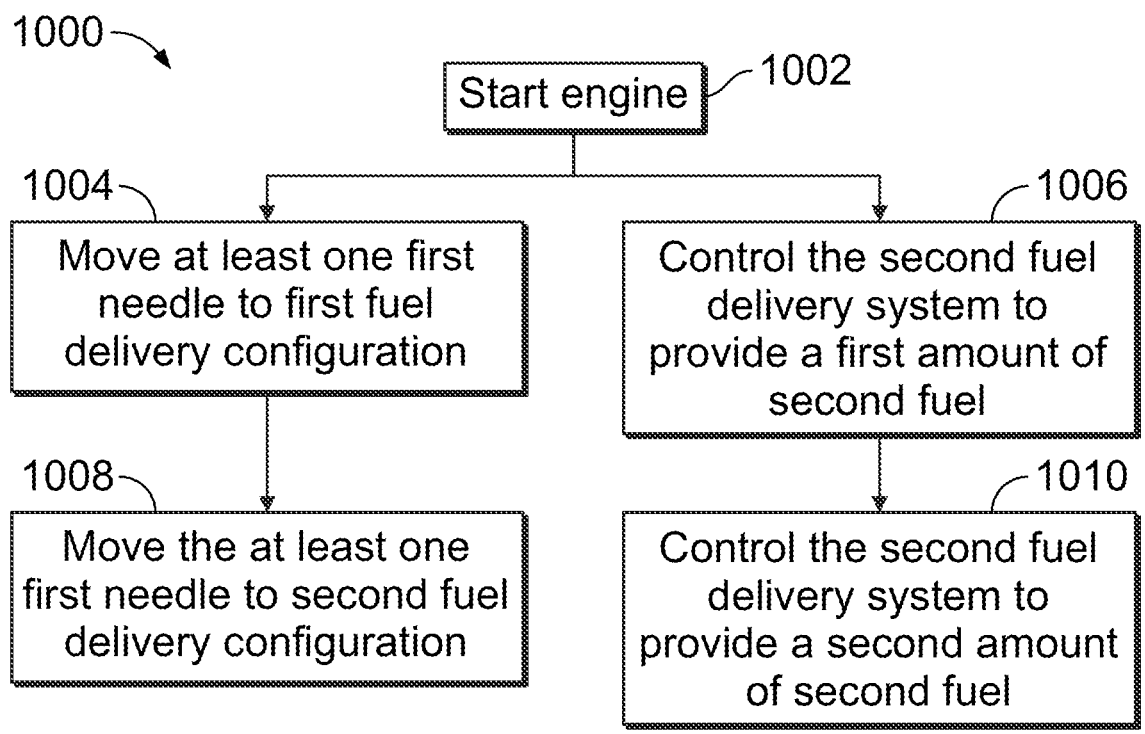
FIG. 10 provides a flowchart of a method for operating an engine in accordance with various embodiments.

FIG. 10 provides a flowchart of a method 1000 for operating an engine (e.g., a reciprocating internal combustion engine) in accordance with various embodiments. In various embodiments, the method 1000, for example, employs structures or aspects of various embodiments (e.g., systems and/or methods, including method 700 discussed in connection with FIG. 7) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1000 are used as one or more algorithms to direct hardware to perform operations described herein. In various embodiments, one or more processors (e.g., processing unit 120) uses portions, aspects, and/or variations of the method 1000 as one or more algorithms for engine control. Generally, the method 1000 is used to provide a first type of fuel via first fuel injector assembly, and a second type of fuel via a second fuel delivery system. It should be noted that the use of two types of fuels is discussed in connection with the example method depicted in FIG. 10. However, additional types of fuel and additional fuel injector assemblies may be used in other embodiments.

At 1002, the engine is started. At 1004, at least one first needle is moved from a closed position to a first fuel delivery configuration that corresponds to a first fuel mixture composition. The at least one first needle is moved with at least one first actuator of the first fuel injector assembly, and is moved within at least one cavity of a first nozzle. The movement of the at least one first needle to the first fuel delivery configuration facilitates delivery of a first amount of the first type of fuel through first openings of the first nozzle to the cylinder. When the first fuel injector assembly is in the closed position, fluid is prevented from flowing through the first openings.

At or around the same time as the movement of the at least one first needle to the first fuel delivery configuration, at 1006, second fuel delivery system is controlled (e.g., a needle of a fuel injector is actuated) to provide a first amount of the second type of fuel corresponding to the first fuel mixture composition when the first fuel injector assembly is in the first fuel delivery configuration. At least one second actuator, for example, may move at least one second needle of the second fuel delivery system. Accordingly, in some embodiments, the actuators of the first and second fuel injector assemblies may be used to move corresponding needles to provide a desired amount of each of the first and second types of fuel to provide a desired or target fuel mixture composition having a desired proportion or share of each type of fuel. As another example, a carburetor, variable flow valve, and/or pressure associated with the second fuel delivery system may be adjusted to provide a different amount of the second type of fuel.

At 1008, the at least one first needle is moved, with the at least one first actuator, within the at least one first cavity from the first fuel delivery configuration to a second fuel delivery configuration. The second fuel delivery configuration corresponds to a second fuel mixture composition to deliver a second amount of fuel through the first openings. For example, the at least one first needle may be moved to provide the first type of fuel at a lower rate in the second fuel delivery configuration relative to the first fuel delivery configuration. For example, where the first type of fuel is used for ignition, a larger relative amount of the first type of fuel may be used during an initial warm up period, or a larger relative amount of the first type of fuel may be used during a portion of the engine cycle corresponding to ignition of a fuel-air mixture in the cylinder.

At or around the same time as the movement of the at least one first needle to the second fuel delivery configuration of the first fuel injector assembly, at 1010, the second fuel delivery system is controlled to provide a second amount of the second type of fuel corresponding to the second fuel mixture composition when the first fuel injector assembly is in the second fuel delivery configuration. Accordingly, the percentage or share of each type of fuel in a fuel mixture may be accurately and reliably varied to account for different desired performance characteristics and/or different amounts of available fuel.

In some embodiments, the first type of fuel and the second type of fuel may be initially delivered to different portions of an engine before mixing in the combustion chamber of a cylinder. For example, in the illustrated embodiment, the first type of fuel is delivered via the first fuel injector assembly directly to the cylinder, and the second type of fuel is delivered via the second fuel delivery system to an intake assembly.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A multi-fuel injector assembly comprising:
a first fuel injector assembly configured to deliver a first type of fuel to a cylinder of an engine, the first fuel injector assembly comprising a first nozzle, a first needle, and a first actuator, the first nozzle comprising a first cavity that houses the first needle;
a second fuel delivery system configured to deliver a second type of fuel to the cylinder, the second fuel delivery system comprising a second nozzle, a second needle, and a second actuator, the second nozzle comprising a second cavity that houses the second needle; and
one or more processors operably connected to the first fuel injector assembly and the second fuel delivery system and configured to control the first fuel injector assembly and the second fuel delivery system to provide a first target fuel composition to the cylinder during a first time period of engine operational and to provide a second target fuel composition to the cylinder during a second time period of engine operation, the first target fuel composition being different from the second target fuel composition,
wherein, to achieve the first target fuel composition, the one or more processors control the first actuator to position the first needle at a first fuel delivery position within the first cavity to deliver a first, non-zero amount of the first type of fuel to the cylinder, and control the second actuator to position the second needle at a first position within the second cavity, and to achieve the second target fuel composition, the one or more processors control the first actuator to move the first needle within the first cavity to a second fuel delivery position to deliver a second, non-zero amount of the first type of fuel to the cylinder, and control the second actuator to move the second needle within the second cavity from the first position to a second position to deliver a non-zero amount of the second type of fuel to the cylinder, such that the second target fuel composition includes both the first and second types of fuel.

2. The multi-fuel injector assembly of claim 1, wherein the first fuel injector assembly is configured to inject the first type of fuel directly into the cylinder, and the second fuel delivery system is configured to provide the second type of fuel into an intake assembly that is operably connected to the cylinder.

3. The multi-fuel injector assembly of claim 1, wherein the first type of fuel is diesel fuel.

4. The multi-fuel injector assembly of claim 3, wherein the second type of fuel comprises at least one of hydrogen, ethanol, methanol, gasoline, ammonia, natural gas, or methane.

5. The multi-fuel injector assembly of claim 4, wherein the first fuel injector assembly is configured to inject the diesel fuel directly into the cylinder, and the second fuel delivery system is configured to emit the at least one of hydrogen, ethanol, methanol, gasoline, ammonia, natural gas, or methane into an intake assembly that is fluidly connected to the cylinder.

6. The multi-fuel injector assembly of claim 1, wherein the first position of the second needle within the second cavity is a closed position of the second fuel delivery system such that the first type of fuel represents 100 percent of the first target fuel composition.

7. The multi-fuel injector assembly of claim 1, wherein the first actuator includes at least a first coil and a second coil disposed around the first needle, the one or more processors configured to activate the first coil to place the first needle in the first fuel delivery position, the one or more processors configured to activate the second coil along with or instead of the first coil to place the first needle in the second fuel delivery position.

8. The multi-fuel injector assembly of claim 1, wherein the first nozzle comprises a first set of nozzle openings and a second set of nozzle openings, wherein, in the first fuel delivery position, the first needle permits flow of the first type of fuel from the first cavity through the first set of nozzle openings but not the second set of nozzle openings, and, in the second fuel delivery position, the first needle permits flow of the first type of fuel from the first cavity through both the first and second sets of nozzle openings.

9. The multi-fuel injector assembly of claim 1, wherein the first needle is an outer needle, and the first fuel injector assembly comprises an inner needle movably disposed in the outer needle.

10. The multi-fuel injector assembly of claim 1, wherein the first time period of engine operation corresponds to an initial warm up period and the second time period of engine operation is after the initial warm up period.

11. The multi-fuel injector assembly of claim 1, wherein the one or more processors are configured to control the second actuator of the second fuel delivery system to position the second needle at the first position within the second cavity to deliver a second non-zero amount of the second type of fuel to the cylinder, such that both the first type of fuel and the second type of fuel are present in each of the first target fuel composition and the second target fuel composition.

12. An engine assembly comprising:
a cylinder of an engine;
an intake assembly operably coupled to the cylinder;
a first fuel injector assembly configured to deliver a first type of fuel directly to the cylinder, the first fuel injector assembly comprising:
a nozzle comprising a cavity in fluid communication with nozzle openings, each of the nozzle openings extending through a wall of the nozzle from the cavity to an exterior surface of the nozzle that is within the cylinder, the nozzle openings comprising a first set of the nozzle openings and a second set of the nozzle openings;
a needle movably disposed within the cavity, the needle preventing flow of the first type of fuel from the cavity through any of the nozzle openings in a closed position of the first fuel injector assembly; and
an actuator that moves the needle within the cavity between the closed position, a first fuel delivery position within the cavity, and a second fuel delivery position within the cavity, wherein the actuator moves the needle from the closed position to the first fuel delivery position to emit a first, non-zero amount of the first type of fuel from the cavity through the first set of nozzle openings while blocking the second set of nozzle openings, and the actuator moves the needle to the second fuel delivery position to emit a second, non-zero amount of the first type of fuel from the cavity through both the first and second sets of nozzle openings; and
a second fuel delivery system configured to deliver a second type of fuel to the intake assembly.

13. The engine assembly of claim 12, wherein the first type of fuel is diesel fuel.

14. The engine assembly of claim 13, wherein the second type of fuel comprises at least one of hydrogen, ethanol, methanol, gasoline, ammonia, natural gas, or methane.

15. The engine assembly of claim 12, further comprising one or more processors communicatively connected to the second fuel delivery system and configured to control the second fuel delivery system to only deliver the second type of fuel to the intake assembly when the needle of the first fuel injector assembly is in the first fuel delivery position.

16. A method comprising:
controlling, via one or more processors, a first fuel injector assembly and a second fuel delivery system to provide a first target fuel composition to a cylinder of an engine during a first time period of engine operation; and
controlling the first fuel injector assembly and the second fuel delivery system to provide a second target fuel composition to the cylinder during a second time period of engine operation, the second target fuel composition being different from the first target fuel composition,
the first fuel injector assembly comprising a first nozzle, a first needle, and a first actuator, the first nozzle comprising a first cavity that houses the first needle, the second fuel delivery system comprising a second nozzle, a second needle, and a second actuator, the second nozzle comprising a second cavity that houses the second needle, wherein the controlling to provide the first target fuel composition during the first time period comprises moving, via the first actuator, the first needle within the first cavity from a closed position to a first fuel delivery position to deliver a first, non-zero amount of a first type of fuel to the cylinder, and positioning, via the second actuator, the second needle at a first position within the second cavity, and the controlling to provide the second target fuel composition during the second time period comprises moving, via the first actuator, the first needle within the first cavity to a second fuel delivery position to deliver a second, non-zero amount of the first type of fuel to the cylinder, and moving, via the second actuator, the second needle within the second cavity from the first position to a second position to deliver a non-zero amount of a second type of fuel to the cylinder, such that the second target fuel composition includes both the first and second types of fuel.

17. The method of claim 16, further comprising delivering the first type of fuel via the first fuel injector assembly directly to the cylinder, and delivering the second type of fuel via the second fuel delivery system to an intake assembly operably connected to the cylinder.

18. The method of claim 16, wherein the first type of fuel is diesel fuel.

19. The method of claim 18, wherein the second type of fuel comprises at least one of hydrogen, ethanol, methanol, gasoline, ammonia, natural gas, or methane.

20. The method of claim 16, wherein the first position of the second needle within the second cavity is a closed position of the second fuel delivery system such that the first type of fuel represents 100 percent of the first target fuel composition.

* * * * *